United States Patent
Nishimura et al.

(10) Patent No.: US 11,492,492 B2
(45) Date of Patent: Nov. 8, 2022

(54) PIGMENT COMPOSITION, METHOD FOR PRODUCING THEREOF, AND AQUEOUS INK COMPOSITION

(71) Applicant: FUJIFILM Corporation, Tokyo (JP)

(72) Inventors: Naoko Nishimura, Kanagawa (JP); Kai Moriya, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 456 days.

(21) Appl. No.: 16/794,241

(22) Filed: Feb. 19, 2020

(65) Prior Publication Data

US 2020/0181411 A1 Jun. 11, 2020

Related U.S. Application Data

(63) Continuation of application No. PCT/JP2018/028329, filed on Jul. 27, 2018.

(30) Foreign Application Priority Data

Aug. 29, 2017 (JP) .............................. JP2017-164810

(51) Int. Cl.

| C09B 5/62 | (2006.01) |
|---|---|
| C09B 57/12 | (2006.01) |
| C09D 11/107 | (2014.01) |
| C09D 11/322 | (2014.01) |
| C08L 33/14 | (2006.01) |
| C08K 5/3417 | (2006.01) |
| C08K 5/3437 | (2006.01) |
| C09B 67/22 | (2006.01) |

(52) U.S. Cl.
CPC ............ *C09B 57/12* (2013.01); *C08K 5/3417* (2013.01); *C08K 5/3437* (2013.01); *C08L 33/14* (2013.01); *C09B 5/62* (2013.01); *C09B 67/0033* (2013.01); *C09D 11/322* (2013.01)

(58) Field of Classification Search
CPC ......... C09B 5/62; C09B 57/12; C09D 11/107; C09D 11/322

See application file for complete search history.

(56) References Cited

U.S. PATENT DOCUMENTS

| 5,948,910 A | 9/1999 | Bauer et al. |
|---|---|---|
| 2007/0129463 A1 | 6/2007 | Ma et al. |
| 2010/0304028 A1 | 12/2010 | Sowinski et al. |
| 2012/0268517 A1 | 10/2012 | Nagano |
| 2014/0066550 A1 | 3/2014 | Shigemori et al. |
| 2016/0222235 A1 | 8/2016 | Iida et al. |

FOREIGN PATENT DOCUMENTS

| CN | 102449081 | 5/2012 |
|---|---|---|
| CN | 103502370 | 1/2014 |
| EP | 0832937 | 4/1998 |
| JP | S58164665 | 9/1983 |
| JP | H07331146 | 12/1995 |
| JP | H11269420 | 10/1999 |
| JP | 2003252864 | 9/2003 |
| JP | 2010070705 | 4/2010 |
| JP | 2012172070 | 9/2012 |
| JP | 2012224822 | 11/2012 |
| JP | 2012528229 | 11/2012 |
| JP | 2015193729 | 11/2015 |
| JP | 2015193729 A * | 11/2015 |
| JP | 2016069487 | 5/2016 |
| JP | 2016141746 | 8/2016 |
| JP | 2017100116 | 6/2017 |
| WO | 2012124643 | 9/2012 |

OTHER PUBLICATIONS

"Search Report of Europe Counterpart Application", dated Jul. 31, 2020, p. 1-p. 5.
"International Search Report (Form PCT/ISA/210)" of PCT/JP2018/028329, dated Oct. 23, 2018, with English translation thereof, pp. 1-5.
"Written Opinion of the International Searching Authority (Form PCT/ISA/237)" of PCT/JP2018/028329, dated Oct. 23, 2018, with English translation thereof, pp. 1-9.
"Office Action of China Counterpart Application", dated Dec. 15, 2020, with partial English translation thereof, pp. 1-11.
"Office Action of India Counterpart Application", dated Aug. 31, 2020, with English translation thereof, pp. 1-5.

* cited by examiner

*Primary Examiner* — Vu A Nguyen
(74) *Attorney, Agent, or Firm* — JCIPRNET

(57) ABSTRACT

A pigment composition including at least one pigment selected from the group consisting of a perinone-based pigment and a perylene-based pigment, water, a resin having a constitutional unit represented by Formula 1, and at least one compound selected from the group consisting of a phthalimide compound having a carboxyalkyl group and a naphthalimide compound having a carboxyalkyl group; a method for producing thereof; and an aqueous ink composition using the pigment composition. In Formula 1, $R^1$ represents a hydrogen atom or a methyl group, $L^2$ represents —C(=O)O—, —OC(=O)—, or —C(=O)NR²— and $R^2$ represents a hydrogen atom or an alkyl group having 1 to 6 carbon atoms, and $R^3$ represents an alkyl group having 6 or more carbon atoms.

Formula (1)

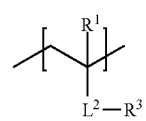

12 Claims, No Drawings

PIGMENT COMPOSITION, METHOD FOR PRODUCING THEREOF, AND AQUEOUS INK COMPOSITION

CROSS-REFERENCE TO RELATED APPLICATIONS

This application is a continuation application of International Application No. PCT/JP2018/028329, filed Jul. 27, 2018, which is incorporated herein by reference. Further, this application claims priority from Japanese Patent Application No. 2017-164810, filed Aug. 29, 2017, which is incorporated herein by reference.

BACKGROUND OF THE INVENTION

1. Field of the Invention

The present disclosure relates to a pigment composition, a method for producing thereof, and an aqueous ink composition.

2. Description of the Related Art

Examples of an image recording method for forming an image on a recording medium such as paper based on an image data signal include a recording method such as an electrophotographic method, a thermal transfer method, and an ink jet method.

The image recording method (ink jet recording method) by the ink jet method does not require a printing plate and directly forms an image on the recording medium by jetting ink only to an image forming portion, so that the ink can be used efficiently, and the running cost is low. With respect to the ink jet recording method, a printing device is relatively inexpensive, can be downsized, and produces less noise than a printing machine in the related art. In this manner, the ink jet recording method has various advantages as compared with other image recording methods.

A dye has been used as a coloring material (colorant) in aqueous ink of an ink jet printer. However, with aqueous ink using a dye, image blurring easily occurs, and there have been restrictions on improving light resistance and water resistance. In order to overcome these disadvantages, recently, aqueous ink using a pigment as a coloring material is used. In the aqueous ink using a pigment, it is required to stably disperse the pigment in an aqueous medium. Therefore, in a pigment dispersion to be used as aqueous ink or a raw material for aqueous ink, a dispersing agent is usually used to enhance the dispersibility and dispersion stability of the pigment.

JP2017-100116A discloses a dispersing agent represented by the general formula (1).

X—R         general formula (1)

(In the formula, X represents the general formula (2) and R represents a sulfone group, a carboxyl group, or any one of the general formulae 3 to 9.)

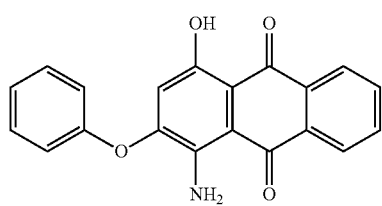

general formula (2)

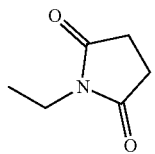

general formula (3)

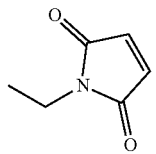

general formula (4)

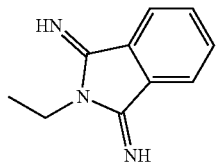

general formula (5)

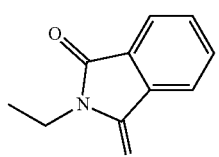

general formula (6)

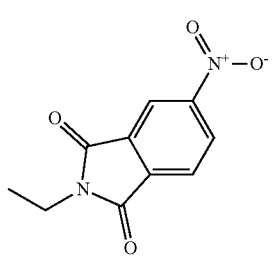

general formula (7)

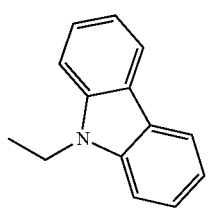

general formula (8)

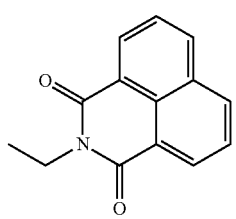

general formula (9)

JP2016-141746A discloses a non-aqueous ink jet ink composition including C. I. Pigment Orange 43 as a pigment and one or more of compounds represented by the general formula (1) as a solvent, in which a content of water contained in the ink composition is 0.1 mass % to 2 mass %.

$$R^1O-(R^2O)_m-R^3 \qquad (1)$$

(In the general formula (1), $R^1$ and $R^3$ each independently represent hydrogen or an alkyl group having 1 to 4 carbon atoms. Here, at least any one of $R^1$ and $R^3$ is an alkyl group having 1 to 4 carbon atoms. $R^2$ represents an alkylene group having 2 or 3 carbon atoms. m represents an integer of 2 or 3.)

JP2012-172070A discloses an aqueous pigment dispersion for aqueous ink preparation for ink jet recording containing an anionic group-containing organic polymer compound, an organic pigment, an organic pigment derivative, and water, in which the polymer compound, the organic pigment, and the organic pigment derivative are dispersed in water, in which a perinone-based orange pigment (A) and an acidic group-containing diarylide azo compound (B) are contained as the organic pigment and the organic pigment derivative.

SUMMARY OF THE INVENTION

JP2017-100116A, JP2016-141746A, or JP2012-172070A discloses various pigment dispersions or ink compositions. However, a use environment, a use aspect, and the like of the pigment composition are diversified, and as a result of examination, the present inventors found that a pigment composition in the related art including a perinone-based pigment or a perylene-based pigment has sufficient sedimentation-inhibiting properties and aggregation-inhibiting properties of a pigment.

An object to be achieved by the embodiment of the present invention is to provide a pigment composition having excellent sedimentation-inhibiting properties and aggregation-inhibiting properties of a pigment.

An object to be achieved by another embodiment of the present invention is to provide a method for producing a pigment composition having excellent sedimentation-inhibiting properties and aggregation-inhibiting properties of a pigment.

In addition, an object to be achieved by another embodiment of the present invention is to provide an aqueous ink composition using the pigment composition.

Means for solving the above problems includes the following aspects.

<1> A pigment composition comprising: at least one pigment selected from the group consisting of a perinone-based pigment and a perylene-based pigment; water; a resin having a constitutional unit represented by Formula 1; and at least one compound selected from the group consisting of a phthalimide compound having a carboxyalkyl group and a naphthalimide compound having a carboxyalkyl group.

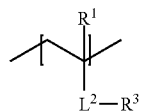

Formula (1)

In Formula 1, $R^1$ represents a hydrogen atom or a methyl group, $L^2$ represents —C(=O)O—, —OC(=O)—, or —C(=O)NR$^2$—, $R^2$ represents a hydrogen atom or an alkyl group having 1 to 6 carbon atoms, and $R^3$ represents an alkyl group having 6 or more carbon atoms.

<2> The pigment composition according to <1>, in which the pigment includes at least one pigment selected from the group consisting of C. 1. Pigment Orange 43, C. I. Pigment Red 194, C. I. Pigment Red 123, C. I. Pigment Red 149, C. I. Pigment Red 178, C. I. Pigment Red 179, C. I. Pigment Red 189, C. I. Pigment Red 190, and C. I. Pigment Black 31.

<3> The pigment composition according to <1> or <2>, in which the pigment includes a perinone-based pigment.

<4> The pigment composition according to any one of <1> to <3>, in which the pigment includes C. I. Pigment Orange 43.

<5> The pigment composition according to any one of <1> to <4>, in which the carboxyalkyl group in the at least one compound selected from the group consisting of a phthalimide compound having a carboxyalkyl group and a naphthalimide compound having a carboxyalkyl group is a carboxymethyl group or a carboxyethyl group.

<6> The pigment composition according to any one of <1> to <5>, in which the at least one compound selected from the group consisting of a phthalimide compound having a carboxyalkyl group and a naphthalimide compound having a carboxyalkyl group is a naphthalimide compound having a carboxyalkyl group.

<7> The pigment composition according to any one of <1> to <6>, in which the resin having a constitutional unit represented by Formula 1 is an acrylic resin.

<8> The pigment composition according to any one of <1> to <7>, in which $R^3$ is an alkyl group having 8 to 22 carbon atoms.

<9> The pigment composition according to any one of <1> to <8>, in which the resin having a constitutional unit represented by Formula 1 further has a constitutional unit having an aromatic ring.

<10> The pigment composition according to any one of <1> to <9>, in which the resin having a constitutional unit represented by Formula 1 further has a constitutional unit having an acidic group.

<11> An aqueous ink composition including the pigment composition according to any one of <1> to <10>.

<12> A method for producing a pigment composition including a step of mixing at least one pigment selected from the group consisting of a perinone-based pigment and a perylene-based pigment; water; a resin having a constitutional unit represented by Formula 1; and at least one compound selected from the group consisting of a phthalimide compound having a carboxyalkyl group and a naphthalimide compound having a carboxyalkyl group.

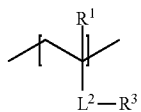

Formula (1)

In Formula 1, $R^1$ represents a hydrogen atom or a methyl group, $L^2$ represents —C(=O)O—, —OC(=O)—, or —C(=O)NR$^2$— and $R^2$ represents a hydrogen atom or an alkyl group having 1 to 6 carbon atoms, and $R^3$ represents an alkyl group having 6 or more carbon atoms.

<13> The method for producing a pigment composition according to <12>, including a step of performing salt-milling treatment on at least one pigment selected from the group consisting of a perinone-based pigment and a perylene-based pigment, before the mixing step.

According to an embodiment of the present invention, it is possible to provide a pigment composition having excellent sedimentation-inhibiting properties and aggregation-inhibiting properties of a pigment.

According to another embodiment of the present invention, it is possible to provide a method for producing a pigment composition having excellent sedimentation-inhibiting properties and aggregation-inhibiting properties of a pigment.

In addition, according to another embodiment of the present invention, it is possible to provide an aqueous ink composition using the pigment composition.

DESCRIPTION OF THE PREFERRED EMBODIMENTS

Hereinafter, the content of the present disclosure will be described in detail.

The "total solid content" in the present specification is a total mass of components obtained by removing a solvent (including water) from the whole composition of the compositions. In addition, the "solid content" is a component obtained by removing a solvent as described above, and for example, may be a solid, or may be a liquid at 25° C.

In the transcription of the group (atomic group) in the present specification, transcription not describing substitution and non-substitution includes groups not having a substituent and having a substituent. For example, the "alkyl group" includes not only an alkyl group (non-substituted alkyl group) not having a substituent but also an alkyl group (substituted alkyl group) having a substituent.

In the present specification, "(meth)acrylate" represents either or both of acrylate and methacrylate, "(meth)acryl" represents either or both of acryl and methacryl, and "(meth)acryloyl" represents either or both of acryloyl and methacryloyl.

In the present specification, the expression "step" includes not only an independent step but also a case where the step is not clearly distinguished from other steps as long as the intended function of the step is achieved.

In the present disclosure, "mass %" and "weight %" have the same definition, and "part by mass" and "part by weight" have the same definition.

In the present disclosure, a combination of two or more preferred aspects is a more preferable aspect.

(Pigment Composition)

A pigment composition according to the present disclosure includes at least one pigment selected from the group consisting of a perinone-based pigment and a perylene-based pigment, water, a resin having a constitutional unit represented by Formula 1, and at least one compound selected from the group consisting of a phthalimide compound having a carboxyalkyl group and a naphthalimide compound having a carboxyalkyl group.

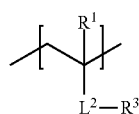

Formula (1)

In Formula 1, $R^1$ represents a hydrogen atom or a methyl group, $L^2$ represents —C(=O)O—, —OC(=O)—, or —C(=O)NR$^2$— and $R^2$ represents a hydrogen atom or an alkyl group having 1 to 6 carbon atoms, and $R^3$ represents an alkyl group having 6 or more carbon atoms.

As described above, as a result of examination, the present inventors found that a pigment composition in the related art including a perinone-based pigment and a perylene-based pigment does not have sufficient sedimentation-inhibiting properties and aggregation-inhibiting properties of a pigment.

In addition, in an ink jet recording method, in particular, a use environment, a use aspect, and the like are diversified, and further improvement in sedimentation-inhibiting properties and aggregation-inhibiting properties of a pigment in a pigment composition used as a raw material of an ink composition, and improvement in storage stability (sedimentation-inhibiting properties and aggregation-inhibiting properties of pigment) of an aqueous ink composition itself due to it are desired.

As a result of intensive examination, the present inventors found that the pigment composition according to the present disclosure is excellent in sedimentation-inhibiting properties and aggregation-inhibiting properties of a pigment by the constitution.

Although the detailed action mechanism for obtaining these effects is unknown, it is assumed as follows.

In an aqueous pigment composition, it is presumed that it is possible to improve dispersibility of a pigment, to suppress sedimentation of a pigment, or to suppress aggregation of each pigment by using a resin having a constitutional unit represented by Formula 1 having an alkyl group having a large number of carbon atoms as a dispersing agent with respect to a perinone-based pigment or a perylene-based pigment. In addition, it is presumed that, by using as a dispersion auxiliary agent at least one compound selected from the group consisting of a phthalimide compound having a carboxyalkyl group and a naphthalimide compound having a carboxyalkyl group, having a similar structure to that of a perinone-based pigment and a perylene-based pigment, the compound interacts with the pigment, and as the compound interacts with the resin having a constitutional unit represented by Formula 1, not only an effect of improving sedimentation-inhibiting properties and aggregation-inhibiting properties by the compound itself but also the effect due to a dispersing agent is also further improved. Therefore, it is presumed that a pigment composition excellent in sedimentation-inhibiting properties and aggregation-inhibiting properties of a pigment is obtained by the pigment composition according to the present disclosure.

Hereinafter, each component included in the pigment composition according to the present disclosure is described.

<Pigment>

The pigment composition according to the present disclosure includes at least one pigment selected from the group consisting of a perinone-based pigment and a perylene-based pigment.

The perinone-based pigment and the perylene-based pigment are not particularly limited as long as the pigments have a perinone structure or a perylene structure, but in view of decreasing sedimentation-inhibiting properties, aggregation-inhibiting properties, and an average particle diameter, the perinone-based pigment is preferably exemplified.

Examples of the perinone-based pigment include C. I. (Color Index) Pigment Orange 43 and C. I. Pigment Red 194.

Examples of the perylene-based pigment include C. I. Pigment Red 123, C. I. Pigment Red 149, C. I. Pigment Red 178, C. I. Pigment Red 179, C. I. Pigment Red 189, C. I. Pigment Red 190, and C. I. Pigment Black 31.

As the pigment used in the present disclosure, in view of decreasing sedimentation-inhibiting properties, aggregation-inhibiting properties, and an average particle diameter, at least one pigment selected from the group consisting of C. I. Pigment Orange 43, C. I. Pigment Red 194, C. I. Pigment Red 123, C. I. Pigment Red 149, C. I. Pigment Red 178, C. I. Pigment Red 179, C. I. Pigment Red 189, C. I. Pigment Red 190, and C. I. Pigment Black 31 is preferably included, at least one pigment selected from the group consisting of C. I. Pigment Orange 43, C. I. Pigment Red 194, C. I. Pigment Red 149, C. I. Pigment Red 178, and C. I. Pigment Red 179 is more preferably included, and at least one pigment selected from the group consisting of C. I. Pigment Orange 43 and C. I. Pigment Red 194 is even more preferably included, and a pigment including C. I. Pigment Orange 43 is particularly preferably included.

A volume average particle diameter of the pigment in the pigment composition according to the present disclosure is preferably 80 nm to 180 nm, more preferably 100 rim to 145 nm, even more preferably 100 nm to 135 nm, particularly preferably 100 nm to 130 rim, and most preferably 100 nm to 125 nm, in view of sedimentation-inhibiting properties and aggregation-inhibiting properties.

The volume average particle diameter of the pigment in the pigment composition can be obtained by being measured by a dynamic light scattering method using a Nanotrac particle size distribution measuring apparatus UPA-EX150 (manufactured by Nikkiso Co., Ltd.).

In addition, regarding an arithmetic average particle diameter of the pigment in the pigment composition, it is possible to measure an average particle diameter by observation of a transmission electron microscope (TEM). Specifically, after a diluted dispersion is dropped on a Cu200 mesh attached with a carbon film and dried, a long diameter of 300 non-overlapped independent particles is measured from an image enlarged by 100,000 times by TEM (1200EX (trade name) manufactured by JEOL Ltd.), and an average value as an average particle diameter is calculated.

One kind of the pigment may be contained alone, or two or more kinds thereof may be contained.

In addition, the pigment composition according to the present disclosure may contain a pigment other than the perinone-based pigment and the perylene-based pigment, but the content of the pigment is preferably 50 parts by mass or less, more preferably 10 parts by mass or less, and even more preferably 1 part by mass or less, with respect to 100 parts by mass of the total content of the perinone-based pigment and the perylene-based pigment.

The content of the pigment in the pigment composition according to the present disclosure is not particularly limited, and is preferably 1 mass % to 30 mass %, more preferably 5 mass % to 25 mass %, and even more preferably 10 mass % to 20 mass % with respect to the total mass of the pigment composition. In a case of using two or more kinds of the pigments, the content refers to a total content of two or more thereof.

<Water>

The pigment composition according to the present disclosure contains water.

The content of water is not particularly limited, and is preferably 5 mass % or more, more preferably 10 mass % or more, even more preferably 20 mass % or more, and particularly preferably 30 mass % or more with respect to the total mass of the pigment composition. The upper limit of the content of water is not particularly limited, but is preferably 95 mass % or less and more preferably 90 mass % or less with respect to the total mass of the pigment composition.

<Resin Having Constitutional Unit Represented by Formula 1>

The pigment composition according to the present disclosure contains a resin (hereinafter, also referred to as a "specific resin") having a constitutional unit (hereinafter, also referred to as a "constitutional unit a-1") represented by Formula 1.

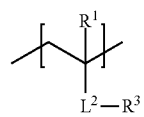

Formula (1)

In Formula 1, $R^1$ represents a hydrogen atom or a methyl group, $L^2$ represents —C(=O)O—, —OC(=O)—, or —C(=O)NR$^2$— and $R^2$ represents a hydrogen atom or an alkyl group having 1 to 6 carbon atoms, and $R^3$ represents an alkyl group having 6 or more carbon atoms.

[Constitutional Unit a-1]

The constitutional unit a-1 is a constitutional unit represented by Formula 1.

In Formula 1, $R^1$ is preferably a methyl group.

In Formula 1, $L^2$ represents —C(=O)O—, —OC(=O)—, or —C(=O)NR$^2$—, and is preferably —C(=O)O— or —C(=O)NR$^2$— and more preferably —C(=O)O—.

$R^2$ is preferably a hydrogen atom.

The denotation of —C(=O)O— means that a carbon atom in —C(=O)O— and a carbon atom to which $R^1$ in Formula 1 is bonded are directly bonded to each other, and the denotation of —OC(=O)— means that a carbon atom in —OC(=O)— and a carbon atom to which $R^1$ in Formula 1 is bonded are directly bonded to each other.

The denotation of —C(=O)NR$^2$— means that a carbon atom in —C(=O)NR$^2$— and a carbon atom to which $R^1$ in Formula 1 is bonded are directly bonded to each other.

In Formula 1, in view of sedimentation-inhibiting properties, aggregation-inhibiting properties, and an average particle diameter, $R^3$ is preferably an alkyl group having 6 to 30 carbon atoms, more preferably an alkyl group having 8 to 22 carbon atoms, even more preferably an alkyl group having 12 to 22 carbon atoms, and particularly preferably an alkyl group having 12 to 18 carbon atoms. The alkyl group may be linear or branched and may have a cyclic structure.

The constitutional unit a-1 is preferably a constitutional unit derived from an alkyl (meth)acrylate compound or an alkyl (meth)acrylamide compound.

The content of the constitutional unit a-1 is preferably 10 mass % to 40 mass %, more preferably 10 mass % to 30 mass %, and particularly preferably 20 mass % to 30 mass %, with respect to the total mass of the specific resin, in view of decreasing sedimentation-inhibiting properties, aggregation-inhibiting properties, and an average particle diameter.

The specific resin used in the present disclosure may contain the constitutional unit a-1 singly and may contain two or more kinds thereof. In a case where the specific resin used in the present disclosure contains two or more kinds of constitutional units a-1, the content thereof is the total content of the two or more kinds of the constitutional units a-1.

[Constitutional Unit a-2]

The specific resin preferably further has a constitutional unit having an aromatic ring (hereinafter, referred to as a "constitutional unit a-2"), and more preferably further has a constitutional unit represented by Formula 2, in view of decreasing sedimentation-inhibiting properties, aggregation-inhibiting properties, and an average particle diameter.

As the aromatic ring, an aromatic hydrocarbon ring is preferable, and a benzene ring is more preferable.

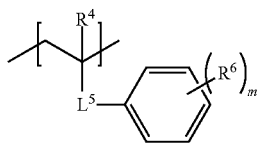

Formula 2

In Formula 2, $R^4$ represents a hydrogen atom or a methyl group, $L^5$ represents a single bond, an alkylene group having 1 to 12 carbon atoms, an alkenylene group having 2 to 12 carbon atoms, or a divalent linking group obtained by combining two or more groups selected from the group consisting of —C(=O)—, —O—, —S—, and —NR$^7$—, $R^6$ represents an alkyl group having 1 to 6 carbon atoms, an alkoxy group having 1 to 15 carbon atoms, an amino group, a halogen atom, an aryloxy group having 6 to 20 carbon atoms, or a silyl group, $R^7$ represents a hydrogen atom or an alkyl group having 1 to 6 carbon atoms, and m represents an integer of 0 to 5.

In Formula 2, $R^4$ is preferably a methyl group.

In Formula 2, $L^5$ is preferably a single bond or a group represented by Formula 2-1 or 2-2 and more preferably a single bond or a group represented by Formula 2-1.

The alkylene group in $L^5$ is preferably an alkylene group having 2 to 10 carbon atoms, more preferably an alkylene group having 1 to 5 carbon atoms, and particularly preferably an alkylene group having 1 to 3 carbon atoms. The alkylene group may be linear or branched.

The alkenylene group in $L^5$ is preferably an alkenylene group having 2 to 10 carbon atoms, more preferably an alkenylene group having 2 to 6 carbon atoms, and particularly preferably an alkenylene group having 2 to 4 carbon atoms. The alkenylene group may be linear or branched.

$R^7$ is preferably a hydrogen atom.

In Formula 2, $R^6$'s each independently and preferably are an alkyl group having 1 to 6 carbon atoms, an alkoxy group having 1 to 6 carbon atoms, a halogen atom, and an aryloxy group having 6 to 20 carbon atoms and more preferably an alkyl group having 1 to 6 carbon atoms, a halogen atom, and an aryloxy group having 6 to 20 carbon atoms.

The alkyl group in $R^6$ and the alkyl group in the alkoxy group may be linear or branched.

The aryloxy group in $R^6$ is preferably a naphthyloxy group or a phenyloxy group and more preferably a phenyloxy group.

In Formula 2, m is preferably 0 or 1 and more preferably 0.

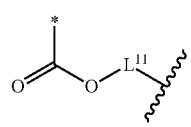

Formula 2-1

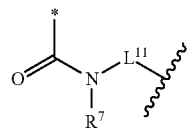

Formula 2-2

In Formulae 2-1 and 2-2, $L^{11}$ represents an alkylene group having 1 to 12 carbon atoms, an alkenylene group having 2 to 12 carbon atoms, —O—, —S—, or a group obtained by combining these, and is preferably an alkylene group having 1 to 12 carbon atoms, —O—, or a group obtained by combining these, more preferably an alkylene group having 1 to 8 carbon atoms, —O—, or a group obtained by combining these, and even more preferably an alkylene group having 1 to 4 carbon atoms, —O—, or a group obtained by combining these.

Examples of the preferable aspect of $L^{11}$ include a divalent linking group represented by Formula 2-3, 2-4, or 2-5.

In Formula 2-2, $R^7$ is the same as $R^7$ in Formula 1, and a preferable aspect is also the same.

In Formulae 2-1 and 2-2, * represents a bonding site at which $R^1$ in Formula 1 bonds to a carbon atom, and a wavy line part represents a bonding site to a benzene ring in Formula 1.

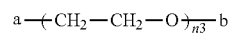

Formula 2-3

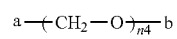

Formula 2-4

Formula 2-5

In Formulae 2-3 to 2-5, a represents a bonding site to 0 in Formula 2-1 or NR$^7$ in Formula 2-2, b represents a bonding site to a benzene ring in Formula 2 in the same manner as the wavy line parts in Formulae 2-1 and 2-2, n3 represents an integer of 1 to 10, n4 represents an integer of 1 to 5, and n5 represents an integer of 1 to 5.

In Formula 2-3, n3 is preferably an integer of 1 to 5.

In Formula 2-4, n4 is preferably an integer of 1 to 3 and more preferably 2.

In Formula 2-5, n5 is preferably an integer of 1 to 3, more preferably 1 or 2, and even more preferably 1.

The constitutional unit a-2 is preferably a constitutional unit derived from styrene, benzyl (meth)acrylate, phenoxyethyl (meth)acrylate, 2-hydroxy-3-phenoxypropyl (meth)acrylate, or phenoxydiethylene glycol (meth)acrylate, more preferably a constitutional unit derived from benzyl (meth)acrylate or phenoxyethyl (meth)acrylate, and even more preferably a constitutional unit derived from benzyl (meth)acrylate.

The content of the constitutional unit a-2 is more preferably 10 mass % to 70 mass %, even more preferably 20 mass % to 60 mass %, still more preferably 25 mass % to 50 mass %, and particularly preferably 30 mass % to 45 mass %, with respect of the total mass of the specific resin, in view of decreasing sedimentation-inhibiting properties, aggregation-inhibiting properties, and an average particle diameter.

The specific resin used in the present disclosure may contain the constitutional unit a-2 singly and may contain two or more kinds thereof. In a case where the specific resin used in the present disclosure contains two or more kinds of constitutional units a-2, the content thereof is the total content of the two or more kinds of the constitutional units a-2.

[Constitutional Unit a-3]

The specific resin preferably further has a constitutional unit having an acidic group (hereinafter, referred to as a "constitutional unit a-3"), in view of decreasing sedimentation-inhibiting properties, aggregation-inhibiting properties, an average particle diameter.

The acidic group in the present disclosure is a substituent having a dissociative proton, and means, for example, a group exhibiting acidity such as a carboxy group, a phosphonyl group, a phosphoryl group, a sulfo group, or a boric acid group. Among these, the acidic group is preferably a carboxy group, a sulfo group, or a phosphonyl group, and more preferably a carboxy group.

The acidic group may have a form of being dissociated by releasing a proton or may form a salt.

In the pigment composition, the constitutional unit a-3 may form a salt with the amine compound described later.

The constitutional unit a-3 is preferably a constitutional unit derived from (meth)acrylic acid, crotonic acid, itaconic acid, maleic acid, fumaric acid, bis(methacryloxyethyl) phosphate, and 2-acrylamido-2-methylpropanesulfonic acid and more preferably a constitutional unit derived from methacrylic acid or acrylic acid.

The content of the constitutional unit a-3 is preferably 3 mass % to 40 mass % and more preferably 5 mass % to 30 mass %, with respect to the total mass of the specific resin, in view of decreasing sedimentation-inhibiting properties, aggregation-inhibiting properties, and an average particle diameter.

The content of the constitutional unit a-3 is an amount in which the acid value of the specific resin is preferably 0.5 mmol/g to 3.5 mmol/g (preferably 1.0 mmol/g to 3.0 mmol/g and more preferably 1.0 mmol/g to 2.5 mmol/g).

The specific resin used in the present disclosure may contain the constitutional unit a-3 singly and may contain two or more kinds thereof. In a case where the specific resin used in the present disclosure contains two or more kinds of constitutional units a-3, the content thereof is the total content of the two or more kinds of the constitutional units a-3.

[Constitutional Unit a-4]

The specific resin used in the present embodiment may contain the constitutional unit a-1 and a constitutional unit a-4 which is a constitutional unit other than the constitutional units a-2 and a-3.

The constitutional unit a-4 is not particularly limited, but is preferably a constitutional unit derived from a monofunctional (meth)acrylate compound or a constitutional unit derived from a monofunctional (meth)acrylamide compound and more preferably a constitutional unit derived from a monofunctional (meth)acrylate compound.

In addition, as the constitutional unit a-4, in view of decreasing sedimentation-inhibiting properties, aggregation-inhibiting properties, and an average particle diameter, a constitutional unit having at least one structure selected from the group consisting of a hydroxy group, an amino group, and a polyalkyleneoxy structure is more preferable. A constitutional unit having a hydroxy group is more preferable.

Examples of the monofunctional (meth)acrylate compound include alkyl (meth)acrylate such as 2-ethylhexyl (meth)acrylate, hydroxyethyl (meth)acrylate, methyl (meth)acrylate, ethyl (meth)acrylate, isopropyl (meth)acrylate, n-propyl (meth)acrylate, and n-butyl (meth)acrylate; 2-methoxyethyl acrylate, 2-(2-methoxyethoxy) ethyl acrylate, 2-(2-methoxyethoxy) ethyl methacrylate, ethoxy triethylene glycol methacrylate, methoxypolyethylene glycol (molecular weight 200 to 1,000) monomethacrylate, and polyethylene glycol (molecular weight 200 to 1,000) monomethacrylate.

Examples of the monofunctional (meth)acrylamide compound include dimethyl acrylamide, hydroxyethyl (meth)acrylamide, hydroxypropyl (meth)acrylamide, dimethylaminoethyl (meth)acrylamide, dimethylaminopropyl (meth)acrylamide, isopropyl (meth)acrylamide, and diacetone acrylamide.

Among these, hydroxyethyl (meth)acrylate, 2-methoxyethyl acrylate, 2-(2-methoxyethoxy) ethyl acrylate, methoxypolyethylene glycol (molecular weight 200 to 1,000) monomethacrylate, polyethylene glycol (molecular weight 200 to 1,000) monomethacrylate, and methyl (meth)acrylate are preferable, and methyl (meth)acrylate are more preferable.

The content of the constitutional unit a-4 is preferably 3 mass % to 40 mass % and more preferably 5 mass % to 30 mass %, with respect to the total mass of the specific resin, in view of decreasing sedimentation-inhibiting properties, aggregation-inhibiting properties, and an average particle diameter.

The specific resin used in the present disclosure may contain the constitutional unit a-4 singly and may contain two or more kinds thereof. In a case where the specific resin used in the present disclosure contains two or more kinds of constitutional units a-4, the content thereof is the total content of the two or more kinds of the constitutional units a-4.

In addition, in view of decreasing sedimentation-inhibiting properties, aggregation-inhibiting properties, and an average particle diameter, the specific resin is preferably a resin having a constitutional unit represented by Formula 1 and a constitutional unit having an aromatic ring; more preferably a resin having a constitutional unit represented by Formula 1, a constitutional unit having an aromatic ring, and a constitutional unit having an acidic group; even more preferably a resin having a constitutional unit represented by Formula 1, a constitutional unit having an aromatic ring, a constitutional unit having an acidic group, and a constitutional unit having at least one structure selected from the group consisting of a hydroxy group, an amino group, and a polyalkyleneoxy structure; and particularly preferably a resin having a constitutional unit represented by Formula 1, a constitutional unit having an aromatic ring, a constitutional unit having an acidic group, and a constitutional unit having a hydroxy group.

In addition, the specific resin is preferably an addition polymerization type resin, and more preferably an acrylic resin, in view of decreasing sedimentation-inhibiting properties, aggregation-inhibiting properties, and an average particle diameter.

The acrylic resin in the present disclosure is a resin having 50 mass % or more of a constitutional unit derived from at least one compound selected from the group consisting of (meth)acrylic compound and (meth)acrylamide compound, preferably 60 mass % or more, more preferably 80 mass % or more, and still more preferably 90 mass % or more.

The specific resin may be a homopolymer or a copolymer, but is preferably a copolymer.

[Content of specific resin] The content of the specific resin is preferably 3 mass % to 50 mass %, more preferably 5 mass % to 40 mass %, and even more preferably 10 mass % to 30 mass %, with respect to the total mass of the pigment composition, in view of decreasing sedimentation-inhibiting properties, aggregation-inhibiting properties, and an average particle diameter.

[Acid Value of Specific Resin]

The acid value of the specific resin is preferably 0.5 mmol/g to 3.5 mmol/g, more preferably 1.0 mmol/g to 3.0 mmol/g, and even more preferably 1.5 mmol/g to 2.5 mmol/g, in view of decreasing sedimentation-inhibiting properties, aggregation-inhibiting properties, and an average particle diameter.

The acid value of the specific resin is measured in conformity with JIS K0070 (1992) and calculated as 1 mmol/g=56.1 mgKOH/g.

[Weight-Average Molecular Weight of Specific Resin]

The weight-average molecular weight of the specific resin is preferably 5,000 to 50,000, more preferably 8,000 to 40,000, and even more preferably 10,000 to 30,000, in view of decreasing sedimentation-inhibiting properties, aggregation-inhibiting properties, and an average particle diameter.

In the present specification, the weight-average molecular weight of the resin is measured by gel permeation chromatography (GPC). In the GPC, HLC-8220 GPC (manufactured by Tosoh Corporation) is used, three columns of TSKgeL Super HZM-H, TSKgeL Super HZ4000, and TSKgeL Super HZ2000 (manufactured by Tosoh Corporation, 4.6 mm ID×15 cm) were connected in series as columns, and N-methylpyrrolidone (NMP) is used as an eluent. As the conditions, a sample concentration is 0.35 mass %, a flow rate is 0.35 ml/min, a sample injection amount is 10 µl, a measurement temperature is 40° C., and a refractive index (RI) detector (differential refractive index detector) is used. The calibration curve is manufactured from eight samples of "Standard sample TSK standard, polystyrene" manufactured by Tosoh Corporation: "F-40", "F-20", "F-4", "F-1", "A-5000", "A-2500", "A-1000", and "n-propylbenzene".

[I/O Value]

An I/O value (inorganic/organic value) of the specific resin is preferably 0.50 to 0.80 and more preferably 0.50 to 0.75, in view of sedimentation-inhibiting properties and aggregation-inhibiting properties.

The I/O value is a value obtained by organic conceptually handling the polarity of various organic compounds, which is also referred to as an inorganic value/organic value, and one of the functional group contribution methods for setting parameters for each functional group.

The I/O value is specifically disclosed in Organic Conceptual Diagram (Koda Yoshio, Sankyo Publishing Co., Ltd. (1984)). The concept of the I/O value represents properties of a compound by dividing the compound into an organic group exhibiting covalent bonding properties and an inorganic group exhibiting ionic bonding properties, and positioning all of the organic compounds one point by one in an orthogonal coordinate identified as an organic axis and an inorganic axis.

The above inorganic value is a value obtained by digitizing the influence of various substituents, bonds, and the like included in the organic compound on the boiling point in terms of the hydroxyl group. Specifically, in a case where the distance between the boiling point curve of the linear alcohol and the boiling point curve of the linear paraffin is set near the carbon number of 5, the distance becomes about 100° C., and thus the influence of one hydroxyl group is set to 100 as a numerical value, so as to set the value obtained by digitizing the influence of various substituents, various bonds, or the like on various boiling points based on the numerical value to be the inorganic value of the substituent included in the organic compound. For example, the inorganic value of —COOH group is 150, and the inorganic value of the double bond is 2. Therefore, the inorganic value of a certain kind of organic compound means the sum of the inorganic values of various substituents, bonds, and the like included in the compound.

A methylene group in a molecule is set as a unit, and the above organic value is defined in terms of the influence of the carbon atom representing the methylene group on the boiling point. That is, since the average value of the boiling point increase due to addition of one carbon at around 5 to 10 carbon atoms of a linear saturated hydrocarbon compound is 20° C., the organic value of one carbon atom is set to 20 based on this, and a value obtained by digitizing the influence of the various substituents, bonds, and the like on various boiling points becomes the organic value. For example, the organic value of a nitro group (—$NO_2$) is 70.

The I/O value that is closer to 0 represents that the organic compound is nonpolar (hydrophobicity and organicity are great), and the greater I/O value represents that the organic compound is polar (hydrophilicity and inorganicity are great).

In the present disclosure, the I/O value of the specific resin means a value obtained by the following method. I/O values (=I value/O value) of each monomer for constituting the specific resin is calculated based on the organicity (O value) and inorganicity (I value) disclosed in page 13 of Organic Conceptual Diagram—Basic and Application— written by Koda, Yoshio (1984). With respect to each monomer constituting a polymer, the product of the (I/O value) and the (mol % in the polymer) is calculated, these are summed up, the third place after the decimal point is rounded off, to obtain the I/O value of the specific resin.

However, as a method for calculating the inorganic value of each monomer, generally, a double bond is added as inorganicity of 2, but in a case of being polymerized, double bonds disappear, and thus in the present disclosure, the I/O value of the specific resin is calculated by using numerical values to which a value for the double bonds are not added, as the inorganic value of the monomer.

In the present disclosure, the I/O value of the specific resin can be adjusted by adjusting the structure and the content ratio of a monomer constituting the specific resin.

Specific examples of the specific resin used in the present disclosure are described below, but the present disclosure is not limited to these. In the specific examples below, denotations in the section of the constitutional units a-1 to a-4 represent structures of the respective constitutional units, denotations of mass % mean contents of the respective constitutional units, numerical values in the section of Mw represent weight-average molecular weights, and denotations of "-" represent that the corresponding constitutional unit is not contained.

TABLE 1

| Specific resin | Constitutional unit a-1 | % by mass | Constitutional unit a-2 | % by mass | Constitutional unit a-3 | % by mass | Constitutional unit a-4 | % by mass | Weight-average molecular weight (Mw) |
|---|---|---|---|---|---|---|---|---|---|
| SP-1 | C18MA | 10 | BzMA | 50 | MAA | 14 | HEMA | 26 | 30,000 |
| SP-2 | C18MA | 20 | BzMA | 39 | MAA | 14 | HEMA | 27 | 23,000 |
| SP-3 | C18MA | 30 | BzMA | 22 | MAA | 14 | HEMA | 34 | 20,000 |
| SP-4 | C18MA | 40 | BzMA | 20 | MAA | 14 | HEMA | 26 | 10,000 |

TABLE 1-continued

| Specific resin | Constitutional unit a-1 | % by mass | Constitutional unit a-2 | % by mass | Constitutional unit a-3 | % by mass | Constitutional unit a-4 | % by mass | Weight-average molecular weight (Mw) |
|---|---|---|---|---|---|---|---|---|---|
| SP-5 | C18MA | 20 | BzMA | 50 | MAA | 30 | — | — | 20,000 |
| SP-6 | C18MA | 20 | BzMA | 39 | MAA | 14 | HEMA | 27 | 22,000 |
| SP-7 | C18MA | 20 | BzMA | 39 | MAA | 14 | HEMA | 27 | 22,000 |
| SP-8 | C18MA | 20 | BzMA | 39 | MAA | 14 | HEMA | 27 | 22,000 |
| SP-9 | C18MA | 20 | BzMA | 41 | MAA | 19 | HEMA | 20 | 23,000 |
| SP-10 | C18MA | 30 | BzMA | 28 | MAA | 18 | HEMA | 24 | 20,000 |
| SP-11 | C18MA | 20 | BzMA | 38 | MAA | 12 | HEMA | 30 | 23,000 |
| SP-12 | C18MA | 30 | BzMA | 24 | MAA | 10 | HEMA | 36 | 20,000 |
| SP-13 | C18MA | 20 | BzMA | 36 | MAA | 9 | HEMA | 35 | 20,000 |
| SP-14 | C18MA | 20 | BzMA | 43 | MAA | 23 | HEMA | 14 | 23,000 |
| SP-15 | C18MA | 20 | BzMA | 34 | MAA | 14 | HEMA | 32 | 19,000 |
| SP-16 | C18MA | 20 | BzMA | 44 | MAA | 14 | HEMA | 22 | 20,000 |
| SP-17 | C18MA | 30 | BzMA | 31 | MAA | 14 | HEMA | 25 | 24,000 |
| SP-18 | C18MA | 30 | BzMA | 23 | MAA | 14 | HEMA | 33 | 35,000 |
| SP-19 | C18MA | 30 | BzMA | 23 | MAA | 14 | HEMA | 33 | 4,500 |
| SP-20 | C18MA | 20 | BzMA | 39 | MAA | 14 | HEMA | 27 | 23,000 |
| SP-21 | C18MA | 20 | BzMA | 50 | MAA | 14 | DMAAm | 16 | 18,000 |
| SP-22 | C18MA | 20 | BzMA | 41 | MAA | 14 | PME | 25 | 18,000 |
| SP-23 | C18MA | 20 | BzMA | 44 | MAA | 14 | DAAAm | 22 | 16,000 |
| SP-24 | C18MA | 20 | PEA | 30 | MAA | 30 | HEMA | 14 | 20,000 |
| SP-25 | C18MA | 20 | POB-A | 30 | MAA | 26 | HEMA | 14 | 20,000 |
| SP-26 | C18MA | 20 | St | 20 | MAA | 26 | HEMA | 14 | 20,000 |
| SP-27 | C22MA | 20 | BzMA | 38 | MAA | 14 | HEMA | 28 | 20,000 |
| SP-28 | C12MA | 20 | BzMA | 38 | MAA | 14 | HEMA | 28 | 20,000 |
| SP-29 | C18MA | 15 | BzMA | 47 | MAA | 4 | HEMA | 34 | 20,000 |
| SP-30 | C18MA | 30 | BzMA | 32 | MAA | 5 | HEMA | 33 | 20,000 |
| SP-31 | C18MA | 40 | BzMA | 20 | MAA | 35 | HEMA | 5 | 20,000 |
| SP-32 | C18MA | 30 | BzMA | 50 | MAA | 12 | HEMA | 8 | 20,000 |
| SP-33 | C18MA | 19 | BzMA | 60 | MAA | 14 | HEMA | 7 | 20,000 |
| SP-34 | C18MA | 20 | BzMA | 29 | MAA | 20 | HEMA | 31 | 10,000 |
| SP-35 | C18MA | 28 | BzMA | 22 | MAA | 23 | HEMA | 27 | 30,000 |
| SP-36 | C18MA | 10 | BzMA | 50 | MAA | 14 | HEMA | 26 | 55,000 |
| SP-37 | C18MA | 30 | BzMA | 23 | MAA | 14 | HEMA | 33 | 40,000 |
| SP-38 | C18MA | 20 | BzMA | 45 | PPE | 25 | HEMA | 10 | 15,000 |
| SP-39 | C18MA | 20 | BzMA | 45 | AMPS | 15 | HEMA | 20 | 15,000 |
| SP-40 | C18MA | 10 | BzMA | 50 | MAA | 14 | HEMA | 26 | 10,000 |
| SP-41 | C18MA | 20 | BzMA | 39 | MAA | 14 | HEMA | 27 | 22,000 |
| SP-42 | CyHMA | 20 | BzMA | 39 | MAA | 14 | HEMA | 27 | 22,000 |
| SP-43 | OctMA | 20 | BzMA | 39 | MAA | 14 | HEMA | 27 | 22,000 |
| SP-44 | 2-EHMA | 20 | BzMA | 39 | MAA | 14 | HEMA | 27 | 22,000 |

In Table 1, details of the structures denoted by abbreviations are as follows. In the following structures, n represents a repeating number.

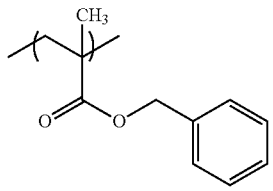

BzMa

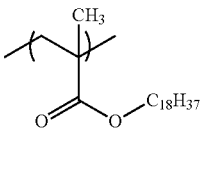

C18MA

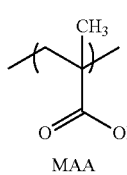

MAA

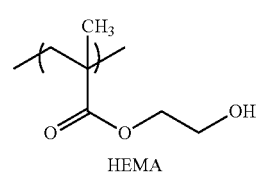

HEMA

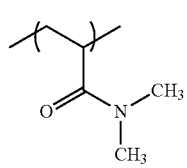

DMAAm

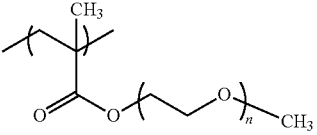

PME
n = 9

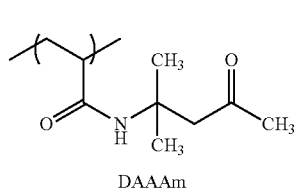

DAAAm

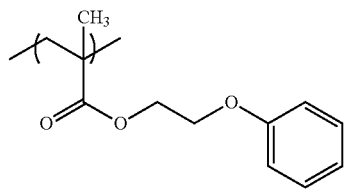

PEA

-continued

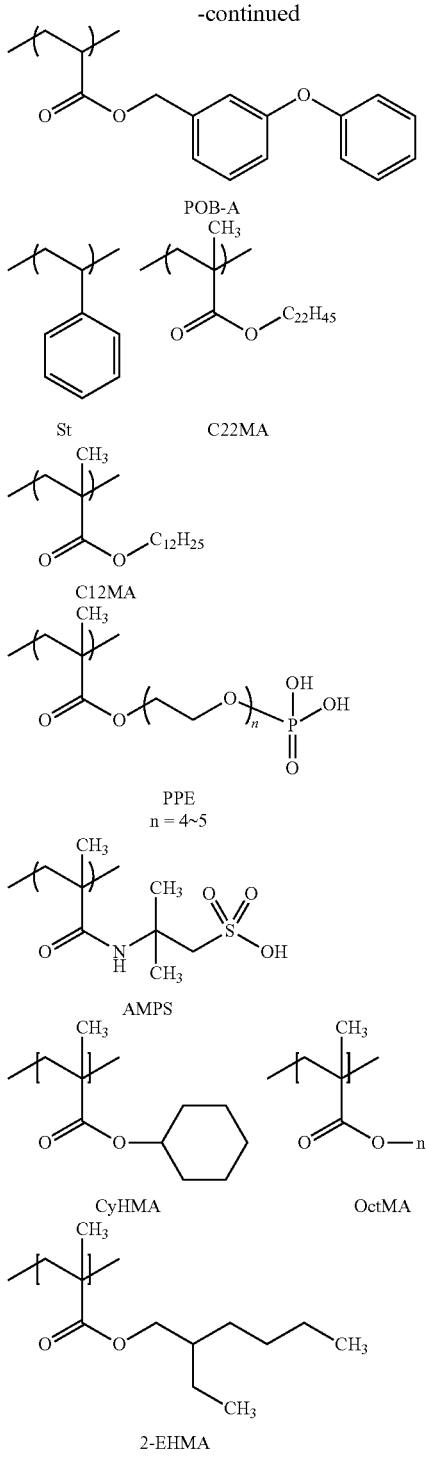

POB-A
St    C22MA
C12MA
PPE
n = 4~5
AMPS
CyHMA    OctMA
2-EHMA

<At Least One Compound Selected from Group Consisting of Phthalimide Compound Having Carboxyalkyl Group and Naphthalimide Compound Having Carboxyalkyl Group>

The pigment composition according to the present disclosure includes at least one compound (hereinafter, also referred to as a "specific compound") selected from the group consisting of a phthalimide compound having a carboxyalkyl group and a naphthalimide compound having a carboxyalkyl group.

The specific compound is preferably a compound in which a carboxyalkyl group is bonded to a nitrogen atom of a phthalimide ring or a naphthalimide ring, in view of decreasing sedimentation-inhibiting properties, aggregation-inhibiting properties, and an average particle diameter.

The carboxyalkyl group preferably has 2 to 10 carbon atoms, more preferably has 2 to 8 carbon atoms, even more preferably has 2 to 5 carbon atoms, and particularly preferably has 2 or 3 carbon atoms, in view of decreasing sedimentation-inhibiting properties, aggregation-inhibiting properties, and an average particle diameter. That is, the carboxyalkyl group is particularly preferably a carboxymethyl group or a carboxyethyl group.

In addition, the specific compound is preferably a naphthalimide compound in view of decreasing an average particle diameter.

A phthalimide ring or a naphthalimide ring in the specific compound may have a substituent, but preferably does not have a substituent. Examples of the substituent include an alkyl group, an aryl group, an alkoxy group, an aryloxy group, and a halogen atom.

As the specific compound, C-1 to C-5 shown below are preferably exemplified, but it is needless to say that the specific compound is not limited thereto.

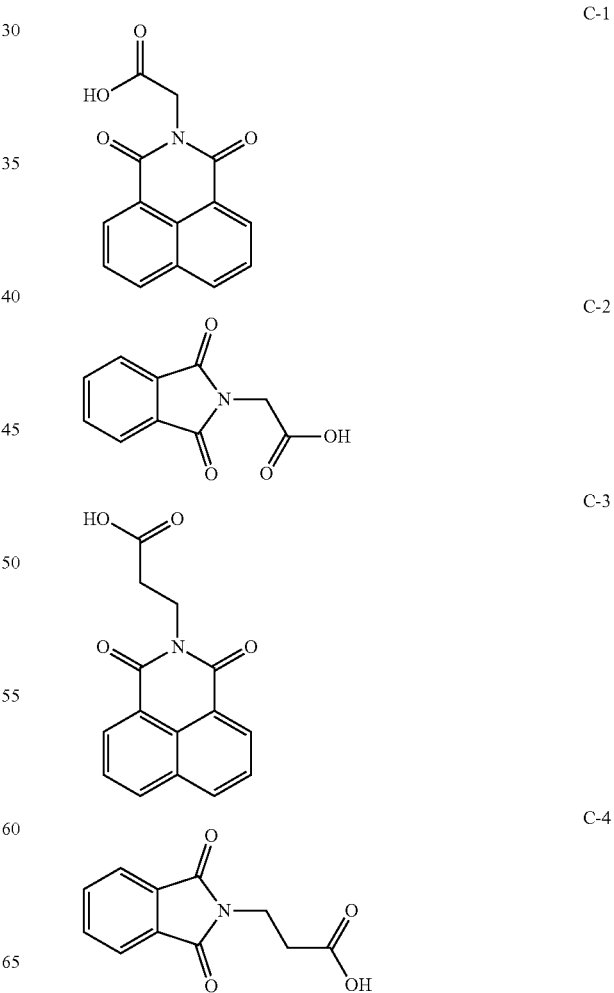

-continued

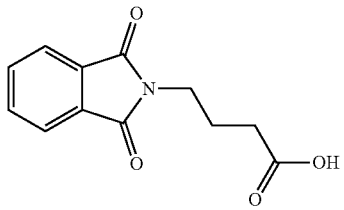

C-5

The pigment composition according to the present disclosure may contain the specific compound singly or may contain two or more kinds thereof in combination.

The content of the specific compound in the pigment composition according to the present disclosure is preferably 0.5 mass % to 10.0 mass %, more preferably 1.0 mass % to 7.0 mass %, even more preferably 2.0 mass % to 5.0 mass %, and particularly preferably 2.5 mass % to 3.5 mass %, with respect to 100 parts by mass of the total content of the pigment. In a case of using two or more kinds of the specific compounds, the content is a total content of two or more kinds thereof.

The method for producing the specific compound is not particularly limited, and for example, it is possible to introduce a carboxyalkyl group into a nitrogen atom of a maleimide compound or a naphthalimide compound by a known method.

<Amine Compound>

The pigment composition according to the present disclosure may include an amine compound.

The amine compound may be present in the pigment composition as an ammonium cation, and the specific resin may be a resin in which at least a part of the acidic group of the constitutional unit a-3 forms a salt with the amine compound and be neutralized.

As the amine compound, in view of sedimentation-inhibiting properties and aggregation-inhibiting properties, a compound represented by Formula 3 is preferably exemplified.

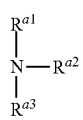

Formula 3

In Formula 3, $R^{a1}$ to $R^{a3}$ each independently represent a hydrogen atom or a substituent, preferably a hydrogen atom, an alkyl group, or a hydroxyalkyl group, and more preferably an alkyl group or a hydroxyalkyl group.

The alkyl group is preferably an alkyl group having 1 to 10 carbon atoms and more preferably an alkyl group having 1 to 4 carbon atoms. The alkyl group may be linear or branched, but is preferably linear.

With respect to the hydroxyalkyl group, the number of carbon atoms of the alkyl group is preferably 1 to 10 and more preferably 1 to 4. The alkyl group may be linear or branched, but is preferably linear. The hydroxyalkyl group is preferably a w-hydroxyalkyl group having a hydroxy group in a terminal of the alkyl group.

The amine compound may be any one of an inorganic amine compound, a primary amine compound, a secondary amine compound, or a tertiary amine compound, but is preferably a secondary amine compound or a tertiary amine compound.

As the amine compound, in view of sedimentation-inhibiting properties and aggregation-inhibiting properties, an alkanolamine compound is preferable.

The alkanolamine compound may be any one of a monoalkanolamine compound, a dialkanolamine compound, and a trialkanolamine compound, and is preferably the monoalkanolamine compound or the dialkanolamine compound, in view of sedimentation-inhibiting properties and aggregation-inhibiting properties.

As the monoalkanolamine compound, a dialkylmonoalkanolamine compound is preferable.

As the dialkanolamine compound, a monoalkyl dialkanolamine compound is preferable.

Specific examples of the amine compound include monomethylamine, dimethylamine, trimethylamine, monoethylamine, diethylamine, triethylamine, monopropylamine, dipropylamine, tripropylamine, monoisopropylamine, diisopropylamine, triisopropylamine, monobutylamine, dibutylamine, tributylamine, dimethylaminoethanol, aminomethyl propanediol (2-amino-2-methyl-1,3-propanol), aminoethyl propanediol (2-amino-2-ethyl-1,3-propanol), and 2-amino-2-methyl-1-propanol.

Among these, in view of sedimentation-inhibiting properties and aggregation-inhibiting properties, dimethylaminoethanol, aminomethyl propanediol, or aminoethyl propanediol are preferable.

The content of the amine compound is preferably 20 mol % to 200 mol %, more preferably 25 mol % to 150 mol %, and even more preferably 40 mol % to 100 mol % with respect to the total amount of the acidic group of the specific resin.

The amine compound may be used singly or two or more kinds thereof may be used in combination. According to the present disclosure, in a case where two or more kinds of the amine compounds are used in combination, it is preferable that the total amount of the amine compounds is in the above range.

<Water-Soluble Organic Solvent>

The pigment composition according to the present disclosure preferably contains a water-soluble organic solvent.

The "water-solubility" in the present disclosure means that the solubility to water at 20° C. is 5 mass % or more.

Examples of the water-soluble organic solvent include an alcohol compound, a ketone compound, an ether compound, an amide compound, a nitrile compound, and a sulfone compound.

Examples of the alcohol compound include ethanol, isopropanol, n-butanol, t-butanol, isobutanol, diacetone alcohol, diethylene glycol, ethylene glycol, dipropylene glycol, propylene glycol, and glycerin.

Examples of the ketone compound include acetone, methyl ethyl ketone, diethyl ketone, and methyl isobutyl ketone.

Examples of the ether compound include tetrahydrofuran and dioxane.

Examples of the amide compound include dimethylformamide and diethylformamide.

Examples of the nitrile compound include acetonitrile.

Examples of the sulfone compound include dimethyl sulfoxide, dimethyl sulfone, and sulfolane.

The content of the water-soluble organic solvent is preferably 3 mass % to 50 mass %, more preferably 10 mass % to 45 mass %, and even more preferably 15 mass % to 40 mass % with respect to the total mass of the pigment composition.

The pigment composition according to the present disclosure may contain the water-soluble organic solvent singly or may contain two or more kinds thereof in combination. In a case where the pigment composition according to the present disclosure includes two or more kinds of water-soluble organic solvents in combination, the content thereof refers to the total content of the water-soluble organic solvents.

<Characteristics of Pigment Composition>

[Content Ratio]

In the pigment composition according to the present disclosure, the content ratio of the content of the pigment and the content of the specific resin is not particularly limited, as long as the pigment can be stably dispersed in the pigment composition, but the content ratio is preferably the pigment:the specific resin=1:0.1 to 1:2 (mass ratio) and more preferably 1:0.2 to 1:1 (mass ratio).

In the pigment composition according to the present disclosure, the content ratio of the content of the specific resin and the content of the amine compound is not particularly limited, as long as the pigment can be stably dispersed in the pigment composition, but the content ratio is preferably the specific resin:the amine compound=1:0.1 to 1:2 (mass ratio) and more preferably 1:0.2 to 1:1 (mass ratio).

[Viscosity]

The viscosity of the pigment composition according to the present disclosure depends on the pigment concentration, but is generally 3 mPa·s to 100 mPa·s and preferably 5 mPa·s to 50 mPa·s. The viscosity of the pigment composition is measured at 25° C. by using a TV-22 type viscometer (manufactured by Toki Sangyo Co., Ltd.).

[pH]

In view of the dispersion stability, the pH of the pigment composition according to the present disclosure at 25° C. is preferably pH 6 to 11, more preferably pH 7 to 10, and even more preferably pH 7 to 9. As a pH measurement method, it is possible to perform measurement at 25° C. using a commercially available pH meter.

(Method for Producing Pigment Composition)

A method for producing a pigment composition according to the present disclosure includes a step of mixing at least one kind of pigment selected from the group consisting of a perinone-based pigment and a perylene-based pigment, water, a resin having a constitutional unit represented by Formula 1, and at least one compound selected from the group consisting of a phthalimide compound having a carboxyalkyl group and a naphthalimide compound having a carboxyalkyl group.

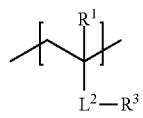

Formula (1)

In Formula 1, $R^1$ represents a hydrogen atom or a methyl group, $L^2$ represents —C(=O)O—, —OC(=O)—, or —C(=O)NR²— and $R^2$ represents a hydrogen atom or an alkyl group having 1 to 6 carbon atoms, and $R^3$ represents an alkyl group having 6 or more carbon atoms.

The pigment composition according to the present disclosure is preferably produced by the method for producing a pigment composition according to the present disclosure.

In the mixing step, an order of mixing the pigment, water, the specific resin, and the specific compound is not particularly limited.

In the mixing step, a method of mixing each component is not particularly limited.

Mixing of each component in the mixing step can be performed by using a twin roll, a triple roll, a ball mill, a tron mill, a disperser, a kneader, a ko-kneader, a homogenizer, a blender, a single-axis or 2-axis extruder, and the like.

The details of kneading and dispersion can be referred to the description in "Paint Flow and Pigment Dispersion" (published by John Wiley and Sons Company, 1964) written by T. C. Patton.

In addition, in view of decreasing an average particle diameter, the method for producing a pigment composition according to the present disclosure preferably includes a step of performing salt-milling treatment on at least one kind of pigment selected from the group consisting of a perinone-based pigment and a perylene-based pigment, before the mixing step.

The salt-milling treatment is a treatment in which a mixture including the pigment, a water-soluble inorganic salt, and a water-soluble organic solvent is injected into a kneading machine, kneaded therein, and ground.

As the water-soluble inorganic salt, a generally used water-soluble inorganic salt can be used without particular limitation. Specifically, for example, an inorganic salt such as sodium chloride, potassium chloride, sodium sulfate, and potassium sulfate can be preferably used.

In addition, an average particle diameter of the water-soluble inorganic salt to be used is preferably 0.5 μm to 50 μm, more preferably 1 μm to 20 μm, and even more preferably 1 μm to 10 μm.

A use amount of the water-soluble inorganic salt is preferably 1 mass time to 30 mass times, and in view of productivity, more preferably 3 mass times to 20 mass times, and even more preferably 5 mass times to 15 mass times, with respect to a use amount of the pigment.

As the water-soluble organic solvent, a solvent which is dissolved in water and does not substantially dissolve the pigment and the water-soluble inorganic salt is preferable, and since the solvent easily evaporates due to the temperature rise during kneading, a high-boiling-point solvent is preferable in view of safety. The water-soluble organic solvent can be used to adjust a mixture including a crude azo pigment and a water-soluble inorganic salt to have a hardness applicable to kneading. Examples of such a water-soluble organic solvent include diethylene glycol, glycerin, ethylene glycol, propylene glycol, liquid polyethylene glycol, liquid polypropylene glycol, 2-(methoxy methoxy)ethanol, 2-butoxy ethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, or a mixture thereof.

A use amount of the water-soluble organic solvent is preferably 0.1 mass times to 5 mass times, with respect to the use amount of the pigment.

A kneading temperature is preferably 20° C. to 130° C., and particularly preferably 40° C. to 110° C.

As the kneading machine, a kneader, a mix-muller, and the like can be preferably used, for example.

In view of sedimentation-inhibiting properties and aggregation-inhibiting properties, an arithmetic average particle diameter of the pigment obtained by salt-milling treatment is preferably 50 nm to 180 nm, more preferably 70 nm to 145 nm, even more preferably 80 nm to 120 nm, and particularly preferably 90 run to 100 nm.

Regarding an average primary particle diameter of the pigment, a long diameter of 300 non-overlapped independent particles is measured from an image enlarged by 100,000 times by TEM (1200EX (trade name) manufactured by JEOL Ltd.), and an average value as an arithmetic average particle diameter is calculated.

(Aqueous Ink Composition)

An aqueous ink composition according to the present disclosure (hereinafter, also simply referred to as an "ink") includes the pigment composition according to the present disclosure.

The content of the pigment composition in the ink is preferably 0.5 mass % to 30 mass %, more preferably 1 mass % to 12 mass %, and even more preferably 2 mass % to 10 mass %, and particularly preferably 2 mass % to 5 mass % with respect to the total solid content of the ink.

The ink according to the present disclosure may further contain a water-soluble solvent and other additives.

Since the ink according to the present disclosure includes the pigment composition according to the present disclosure, it is possible to form an image excellent in not only sedimentation-inhibiting properties and aggregation-inhibiting properties of a pigment but also ink-jetting stability and having a high image density.

<Water-Soluble Organic Solvent>

The ink according to the present disclosure may contain at least one water-soluble organic solvent.

The water-soluble organic solvent can be used to obtain effects of prevention of drying, wetting, or promotion of permeation. In order to prevent drying, the water-soluble organic solvent is used as an anti-drying agent, which prevents ink from being attached and dried in an ink jetting port of an injection nozzle to be aggregates and cause clogging, and in prevention of drying or wetting, a water-soluble organic solvent having a lower vapor pressure than water is preferable. In addition, in order to promote permeation, the water-soluble organic solvent can be used as a permeation enhancer which increases ink permeability onto a sheet.

As the anti-drying agent, a water-soluble organic solvent having a lower vapor pressure than water is preferable. Specific examples of such a water-soluble organic solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin, trimethylolpropane, and the like; lower alkyl ethers of polyhydric alcohol such as ethylene glycol monomethyl(or ethyl)ether, diethylene glycol monomethyl(or ethyl) ether, and triethylene glycol monoethyl(or butyl)ether; heterocycles such as 2-pyrrolidone, N-methyl-2-pyrrolidone, 1,3-dimethyl-2-imidazolidinone, and N-ethyl morpholine; sulfur-containing compound such as sulfolane, dimethyl sulfoxide, and 3-sulfolene; polyfunctional compounds such as diacetone alcohol and diethanolamine; and urea derivatives.

Among these, as the anti-drying agent, polyhydric alcohols such as glycerin and diethylene glycol are preferable.

One kind of the anti-drying agent may be used alone, or two or more kinds thereof may be used in combination. The content of the anti-drying agent is preferably within a range of 10 mass % to 50 mass % with respect to the total mass of the ink.

The permeation enhancer is suitable for the purpose of allowing the ink to permeate better into a recording medium (printing paper and the like). As specific examples of such a water-soluble organic solvent, alcohols such as ethanol, isopropanol, butanol, di(tri)ethylene glycol monobutyl ether, and 1,2-hexanediol, sodium lauryl sulfate, sodium oleate, or a nonionic surfactant can be suitably used.

One kind of the permeation enhancer may be used alone, or two or more kinds thereof may be used in combination. The content of the permeation enhancer is preferably within a range of 5 mass % to 30 mass % with respect to the total mass of the ink. In addition, the permeation enhancer is preferably used within a range of an amount not causing bleeding of an image and paper loss (print-through).

The water-soluble organic solvent can be used for adjusting viscosity in addition to the above-described use. Specific examples of the water-soluble organic solvent capable of being used in adjustment of viscosity include alcohol (for example, methanol, ethanol, propanol, isopropanol, butanol, isobutanol, sec-butanol, t-butanol, pentanol, hexanol, cyclohexanol, benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivative (for example, ethylene glycol monomethyl ether, ethylene glycol monoethyl ether, ethylene glycol monobutyl ether, dethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, ethylene glycol monophenyl ether), amine (for example, ethanolamine, diethanolamine, triethanolamine, N-methyldiethanolamine, N-ethyl diethanolamine, morpholine, N-ethyl morpholine, ethylene diamine, diethylene triamine, triethylene tetramine, polyethylene imine, tetramethyl propylene diamine), and other polar solvents (for example, formaldehyde, N,N-dimethyl formaldehyde, N,N-dimethyl acetoamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Even in this case, one kind of the water-soluble organic solvent may be used alone, or two or more thereof may be used in combination.

<Water>

The ink according to the present disclosure contains water. The ink according to the present disclosure may further contain water, in addition to water contained in the pigment composition.

The content of the water is not particularly limited, but is preferably 10 mass % to 99 mass %, more preferably 30 mass % to 80 mass %, and even more preferably 50 mass % to 70 mass % with respect to the total mass of the ink.

<Other Additives>

The ink according to the present disclosure can be constituted by using other additives in addition to the components. Examples of other additives include known additives such as a water-soluble polymerization compound, a polymerization initiator, a resin particle, a fading inhibitor, an emulsion stabilizer, a permeation enhancer, an ultraviolet absorbing agent, a preservative, an antibacterial agent, a pH adjuster, a surface tension adjuster, an anti-foaming agent, a viscosity adjuster, a dispersant, a dispersion stabilizer, a rust inhibitor, a chelating agent. The various additives are directly added to the ink.

The water-soluble polymerization compound can improve adhesiveness of an image. Regarding a preferable aspect of the water-soluble polymerization compound, appropriately refer to the disclosure of paragraphs 0037 to 0061 of JP2011-231315A.

The polymerization initiator can improve rub resistance of an image by being added with the water-soluble polymerization compound, and it is advantageous in high-speed recording. Regarding a preferable aspect of the initiator, appropriately refer to the disclosure of paragraphs 0062 to 0065 of JP2011-231315A.

The ultraviolet absorbing agent can improve storage stability of an image. As the ultraviolet absorbing agent, it is also possible to use a compound emitting fluorescence by absorbing ultraviolet rays, a so-called fluorescent whitening agent, represented by a benzotriazole-based compound disclosed in JP1983-185677A (JP-S58-185677A), JP1986-190537A (JP-S61-190537A), JP1990-000782A (JP-H02-000782A), JP1993-197075A (JP-H05-197075A), JP1997-034057A (JP-H09-034057A), and the like; a benzophenone-based compound disclosed in JP1971-002784A (JP-S46-002784A), JP1993-194483A (JP-H05-194483A), U.S. Pat. No. 3,214,463B, and the like; a cinnamic acid-based compound disclosed in JP1973-030492B (JP-S48-030492B), JP1981-021141B (JP-S56-021141B), JP1998-088106A (JP-H10-088106A), and the like; a triazine-based compound disclosed in JP1992-298503A (JP-H04-298503A), JP1996-053427A (JP-H08-053427A), JP1996-239368A (JP-H08-239368A), JP1998-182621A (JP-H10-182621A), JP1996-501291T (JP-H08-501291T), and the like; a compound disclosed in research disclosure No. 24239; and a stilbene-based or benzoxazole-based compound.

The fading inhibitor can improve storage stability of an image. Examples of the fading inhibitor include various organic and metal complex fading inhibitors. Examples of the organic fading inhibitors include hydroquinones, alkoxy phenols, dialkoxy phenols, phenols, anilines, amines, indanes, chromans, alkoxy anilines, and heterocycles, and examples of the metal complex fading inhibitors include nickel complexes and zinc complexes. More specifically, it is possible to use compounds disclosed in patents cited in items I and J of section VII of research disclosure No. 17643, No. 15162, left column in page 650 of No. 18716, page 527 of No. 36544, page 872 of No. 307105, and No. 15162; or compounds contained in general formulae and compound examples of representative compounds disclosed in pages 127 to 137 of JP1987-215272A (JP-S62-215272A).

Examples of the antibacterial agent include sodium dehydroacetate, sodium benzoate, sodium pyridinethione-1-oxide, p-hydroxy benzoic acid ethyl ester, 1,2-benzoylthiazoline-3-on, and a salt thereof. The content of the antibacterial agent is preferably within a range of 0.02 mass % to 1.00 mass % with respect to the total mass of the ink.

As the pH adjuster, it is possible to use a neutralizer (organic base, inorganic alkali). The pH adjuster can improve storage stability of an ink. The pH adjuster is preferably added such that the pH of the ink is 6 to 10, and more preferably added such that the pH of the ink is 7 to 10.

Examples of the surface tension adjuster include a nonionic surfactant, a cationic surfactant, an anionic surfactant, and a betaine surfactant.

An addition amount of the surface tension adjuster is preferably within a range capable of adjusting the surface tension of the ink to be 20 mN/m to 60 mN/m, more preferably within a range capable of adjusting the surface tension of the ink to be 20 mN/m to 45 mN/m, and even more preferably within a range capable of adjusting the surface tension of the ink to be 25 mN/m to 40 mN/m. In a case where the addition amount is within the range, it is possible to favorably drop the surface tension adjuster by an ink jet method.

Specific examples of the surfactant preferably include an anionic surfactant such as fatty acid salt, alkylsulfuric acid ester salt, alkylbenzene sulfonic acid salt, alkylnaphthalene sulfonic acid salt, dialkylsulfosuccinic acid salt, alkyl phosphoric acid ester salt, naphthalene sulfonic acid formalin condensate, and polyoxyethylene alkyl sulfuric acid ester salt, among hydrocarbon-based surfactant, or a nonionic surfactant such as polyoxy ethylene alkyl ether, polyoxy ethylene alkyl aryl ether, polyoxy ethylene fatty acid ester, sorbitan fatty acid ester, polyoxy ethylene sorbitan fatty acid ester, polyoxy ethylene alkyl amine, glycerin fatty acid ester, and oxyethylene-oxypropylene block copolymer.

In addition, an amine oxide type amphoteric surfactant such as N,N-dimethyl-N-alkylamine oxide is also preferable.

In addition, it is also possible to use those exemplified as a surfactant in page (37) and page (38) of JP1984-157636A (JP-S59-157636A) and research disclosure No. 308119 (1989).

In addition, it is possible to improve rub resistance by using a fluorine (fluorinated alkyl)-based surfactant, a silicone-based surfactant, and the like disclosed in each of JP2003-322926A, JP2004-325707A, and JP2004-309806A.

Among these surfactants, in view of being capable of further improving wettability of a pigment surface and improving dispersibility of a mixture solution, a nonionic surfactant is preferable, and a compound having an acetylenediol group is more preferable.

The compound having an acetylenediol group used in the present disclosure is more preferably an ethylene oxide adduct of acetylenediol.

Specific examples of the compound having an acetylenediol group include 2,4,7,9-tetramethyl-5-decyne-4,7-diol, 3,6-dimethyl-4-octyl-3,6-diol, and 3,5-dimethyl-1-hexyn-3-ol.

In addition, as the compound having an acetylenediol group, a commercially available product can be used. Specifically, SURFYNOL82, 465, and 485 manufactured by AirProducts & Chemicals, DYNOL604 and 607, OLEFIN STG and OLEFIN E1010 manufactured by Nissin Chemical Co., Ltd., and the like are exemplified.

An addition amount of the surfactant is preferably 30 parts by mass to 100 parts by mass, and more preferably 5 parts by mass to 30 parts by mass, with respect to 100 parts by mass of the total mass of the pigment.

A hydrophile-Lipophile Balance (HLB) value of the surfactant is preferably 6 to 13 and more preferably 8 to 13.

HLB is a value calculated by the HLB value (20 Mw/M, Mw=molecular weight of hydrophilic site, M=molecular weight of nonionic surfactant) of GRIFFIN.

The method for manufacturing an ink according to the present disclosure is not particularly limited, but the following method is exemplified.

The method for producing an ink according to the present disclosure is preferably a method including a step of producing an ink by mixing the pigment dispersion, the water-soluble organic solvent, and other additives, and may include other steps as necessary.

<Characteristics of Aqueous Ink Composition>

[Viscosity]

The viscosity of the aqueous ink composition according to the present disclosure is not particularly limited, but the viscosity at 25° C. is preferably 1.2 mPa·s to 15.0 mPa·s, more preferably 2 mPa·s or more and less than 13 mPa·s, and even more preferably 2.5 mPa·s or more and less than 10 mPa·s. The viscosity of the aqueous ink composition is measured at 25° C. by using a TV-22 type viscometer (manufactured by Toki Sangyo Co., Ltd.).

[pH]

pH of the aqueous ink composition according to the present disclosure at 25° C. is preferably 6 to 11 in view of dispersion stability. In a case of being used as an ink set including an acidic treatment agent, since it is preferable to aggregate the ink composition at a high speed by contact with a treatment agent including an acidic compound and the like, a pH of the aqueous ink composition according to the present disclosure at 25° C. is more preferably 7 to 10, and even more preferably 7 to 9.

[Application]

The aqueous ink composition according to the present disclosure can be used as an ink for stationery such as a felt-tip pen or a marker or as an ink for various printers. Among these, in view of excellent pigment dispersibility and dispersion stability, it is preferable to be used for ink jet recording.

EXAMPLES

Hereinafter, the embodiment of the present invention will be described in more detail with reference to examples, but the present disclosure is not limited thereto.

Synthesis Example 1: Synthesis of Resin P-1

The same amount of dipropylene glycol as the total amount of monomers described below was added to a three-neck flask equipped with a stirrer and a cooling pipe and heated to 85° C. under a nitrogen atmosphere.

A solution I obtained by mixing 9.1 mole equivalent of stearyl methacrylate, 34.0 mole equivalent of benzyl methacrylate, 31.9 mole equivalent of hydroxyethyl methacrylate, 25.0 mole equivalent of methacrylic acid, and 0.8 mole equivalent of 2-mercaptopropionic acid and a solution II obtained by dissolving 1 mass % of t-butylperoxy-2-ethylhexanoate (PERBUTYL O manufactured by NOF Corporation) in 20 mass % of dipropylene glycol with respect to the total mass of the monomers were prepared. The solution I was added dropwise over four hours and the solution II was added dropwise over five hours in the three-neck flask.

After completion of the dropwise addition, the mixture was further reacted for two hours, and then the temperature was raised to 95° C., and stirring under heating was performed for three hours, such that all unreacted monomers were reacted. The disappearance of the monomer was confirmed by $^1$H-NMR.

The obtained reaction solution was heated to 70° C., 20.0 mole equivalent of dimethylaminoethanol (dimethylethanolamine) as an amine compound was added, and then propylene glycol was added and stirred to obtain a 30 mass % solution of a resin P-1. The constituent components of the obtained polymer were confirmed by $^1$H-NMR. In addition, a weight-average molecular weight (Mw) was obtained by GPC, and Mw=22,000. A mass ratio of each constitutional unit in the resin P-1 was constitutional unit derived from stearyl methacrylate/constitutional unit derived from benzyl methacrylate/constitutional unit derived from hydroxyethyl methacrylate/constitutional unit derived from methacrylic acid=20/39/27/14. Here, the mass ratio is a value in which dimethylaminoethanol is not included.

A numerical value at the lower right of parentheses of each constitutional unit is a molar ratio.

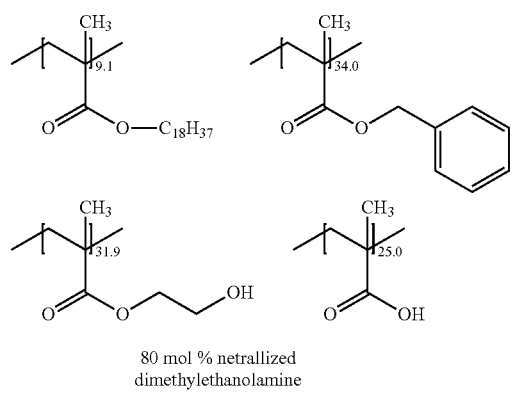

80 mol % netrallized dimethylethanolamine

Synthesis Example 2: Synthesis of Resin P-2

Synthesis of a resin P-2 was performed in the same manner as that of the synthesis of the resin P-1 except that an amount of each monomer to be used was changed such that a mass ratio of constitutional unit derived from stearyl methacrylate/constitutional unit derived from benzyl methacrylate was 15/44.

Synthesis Example 3: Synthesis of Resin P-3

Synthesis of a resin P-3 was performed in the same manner as that of the synthesis of the resin P-1 except that an amount of each monomer to be used was changed such that a mass ratio of constitutional unit derived from stearyl methacrylate/constitutional unit derived from benzyl methacrylate was 45/14.

Synthesis Examples 4 to 6: Synthesis of Resins P-4 to P-6

Synthesis of resins P-4 to P-6 was performed in the same manner as that of the synthesis of the resin P-1 except that an amount of each monomer to be used was changed such that, instead of stearyl methacrylate, cyclohexyl methacrylate (resin P-4), n-octyl methacrylate (resin P-5), or 2-ethylhexyl methacrylate (resin P-6) was set to be an amount of constitutional unit represented by Formula 1 described in Table 1.

The constitutional unit derived from each monomer is shown below.

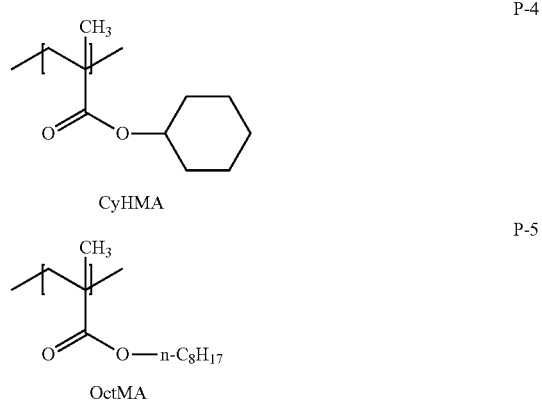

-continued

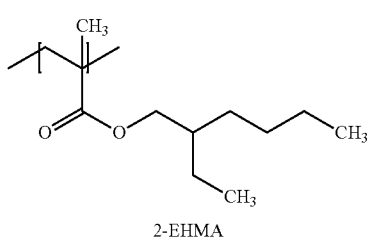

2-EHMA

Synthesis Examples 7 to 9: Synthesis of Resins P-7 to P-9

Synthesis of resins P-7 to P-9 was performed in the same manner as that of the synthesis of the resin P-1 except that, instead of benzyl methacrylate, phenoxy ethyl methacrylate (resin P-7), 2-phenoxy benzyl acrylate (resin P-8), or styrene (resin P-9) was used in an equivalent molar amount.

The constitutional unit derived from each monomer is shown below.

P-7

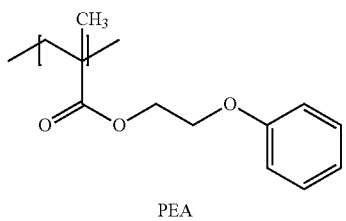

PEA

P-8

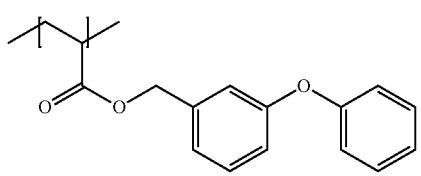

POB-A

P-9

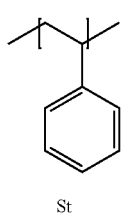

St

Synthesis Examples 10 to 12: Synthesis of Resins P-10 to P-12

Synthesis of resins P-10 to P-12 was performed in the same manner as that of the synthesis of the resin P-1 except that, instead of hydroxyethyl methacrylate, N,N-dimethyl acrylamide (resin P-10), methoxy polyethylene ethylene glycol methacrylate (resin P-11), or diacetone acrylamide (resin P-12) was used in an amount in which a mass ratio of the corresponding constitutional unit was the same as that of the resin P-1.

The constitutional unit derived from each monomer is shown below.

P-10

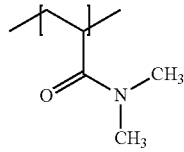

DMAAm

P-11

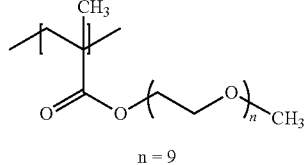

n = 9
PME

P-12

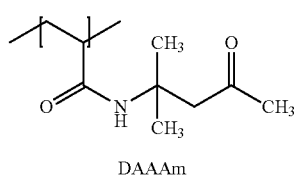

DAAAm

Synthesis Examples 13 and 14: Synthesis of Resins P-13 and P-14

Synthesis of resins P-13 and P-14 was performed in the same manner as that of the synthesis of the resin P-1 except that, instead of dimethylaminoethanol, aminomethyl propanediol (resin P-13) or aminoethyl propanediol (resin P-14) was used in an amount in which a mass ratio of the corresponding constitutional unit was the same as that of the resin P-1.

Example 1

<Solvent Salt-Milling Treatment of Pigment>

A crude pigment and saline were put in a super mixer and mixed therein so as to obtain the following composition. While rotating the super mixer, diethylene glycol was gradually added thereto to prepare a mixture of the pigment (hereinafter, referred to as a "pre-mixture").

Pigment described in Table 2: 100 parts by mass
Saline (Nakuru UM-10, manufactured by Naikai Salt Industries, particle diameter 10 µm): 1,500 parts by mass
Diethylene glycol (DEG): 300 parts by mass Subsequently, temperatures of 5 sites of a grinding portion and an extruding portion of a 1-axis continuous kneading machine (manufactured by Asada Iron Works Co., Ltd., Miracle KCK-L) were set to 15° C. to 20° C. and the shaft rotation speed was set to 40 rpm, and the obtained pre-mixture was put into the 1-axis continuous kneading machine to obtain a kneaded product. At this time, a current value (load) was approximately 5A, a jetting amount was 50 g/minute, and a temperature of a jetted product was 19° C.

1,000 parts by mass of the kneaded product obtained in this way was put in 5,000 parts by mass of pure water of which temperature was raised to 80° C., stirring treatment was performed thereon by using a clear mix, filtration and sufficient washing with water were performed thereon so that saline and diethylene glycol were removed therefrom, and the resultant product was dried at 85° C. for a whole day and night to obtain 100 parts by mass of a pigment composition.

<Preparation of Pigment Composition 1>

100 parts by mass of a solution of the obtained resin P-1, 95 parts by mass of the pigment on which solvent salt-milling treatment is performed, and 240 parts by mass of water were mixed with one another to obtain a mixture solution.

Subsequently, by using Labo Star Mini LMZ015 (manufactured by Ashizawa Finetech Ltd., bead diameter: 0.3 mmφ, zirconia beads), a dispersion treatment was performed for 3 hours. A pigment dispersion product obtained in this way was subjected to a centrifugal treatment (manufactured by Kubota Corporation, high-speed large capacity cooling centrifuge 7780) at 7000G for 30 minutes, and the resultant product was adjusted with ultrapure water such that a concentration of solid contents of the pigment in the treated solution was 15 mass %, thereby obtaining a pigment composition 1.

<Preparation of Aqueous Ink Composition 1>

Raw materials were mixed with the following formulation composition, the obtained mixture solution was filtrated through a glass filter (GS-25) manufactured by ADVANTEC Co., Ltd., and filtrated through a filter (polyvinylidene fluoride (PVDF) film, pore size of 5 μm) manufactured by Millipore Corporation, so as to manufacture an aqueous ink composition 1.

—Composition of Aqueous Ink Composition 1—

Pigment composition 1: 16.5 parts by mass
Glycerin: 7 parts by mass
Diethylene glycol: 9 parts by mass
Propylene glycol: 9 parts by mass
OLFINE E1010 (surfactant manufactured by Nissin Chemical Industry Co., Ltd.): 1 part by mass
Ion exchange water: An amount such that the total amount became 100 parts by mass <Measurement of Average Primary Particle Diameter>

An average primary particle diameter of the pigment was measured by using TEM (1200EX (trade name) manufactured by JEOL Ltd.). Specifically, the pigment composition diluted by 1,000 times was dropped on a Cu200 mesh attached with a carbon film and dried, a long diameter of 300 non-overlapped independent particles was measured from an image enlarged by 100,000 times by TEM, and an average value as an average particle diameter was calculated.

<Volume Average Particle Diameter>

The volume average particle diameter of the pigment in the pigment composition was measured by a dynamic light scattering method using a Nanotrac particle size distribution measuring apparatus UPA-EX150 (manufactured by Nikkiso Co., Ltd.). In measurement, a solution obtained by diluting the pigment which was subjected to dispersion treatment by 1,000 times was used.

<Evaluation of Sedimentation-Inhibiting Properties>

Both ends of a tube having a length of 30 cm×a diameter of φ0.7 cm were closed and placed vertically, and the obtained aqueous ink composition was filled up to a height of 25 cm. The resultant product was left at room temperature (25° C.) for 1 week, and the solution of 2 cm from the lower end was collected, measurement of the absorbance was performed, and a rate of change of a concentration with respect to the absorbance of an initial aqueous ink composition was calculated. The greater the sedimentation amount of the pigment is, the greater the rate of change of the absorbance becomes. The evaluation standard is shown below.

—Evaluation Standard—

AA: The rate of change of the absorbance is 2% or less
A: The rate of change of the absorbance is more than 2% and equal to or less than 5%
B: The rate of change of the absorbance is more than 5% and equal to or less than 10%
C: The rate of change of the absorbance is more than 10% and less than 50%
D: The rate of change of the absorbance is 50% or more <Evaluation of Aggregation-Inhibiting Properties (Ink-Jetting Stability Test)>

A GEL JET GX5000 printer head manufactured by Ricoh Corporation was fixed in a direction orthogonal to a moving direction (sub-scanning direction) of a stage movable in a predetermined straight-line direction at 500 mm/second, matched in a direction (main scanning direction) of a line head in which nozzles are arranged.

Subsequently, an aqueous ink composition which was obtained in a storage tank connected thereto was refilled. As a recording medium, Photofinishing Pro manufactured by Fujifilm Corporation was attached to the stage.

Subsequently, the stage was moved at 248 mm/minute, and 2,000 ink droplets per nozzle (one jetting hole) were jetted at an ink droplet amount of 3.4 pL, a jetting frequency of 10 kHz, a nozzle arrangement direction×transporting direction of 75 dots per inch (dpi)×1,200 dpi such that 96 lines were in parallel to the transporting direction, thereby producing a print sample.

The obtained print sample was visually observed, and it was checked that an aqueous ink composition was jetted from all nozzles (jetting holes).

After the ink jetting, the head was left in the state as it was for 3 hours in an environment of 25° C. and 80% RH, a new recording medium was attached thereto, and the aqueous ink composition was jetted under the same condition as described above to produce a print sample.

The obtained print sample was visually observed, and the number of non-jetting nozzles after jetting 2,000 ink droplets was evaluated.

Evaluation was performed as A to D depending on the number of non-jetting nozzles (unit: piece). At this time, the smaller the number of non-jetting nozzles is, aggregation-inhibiting properties are more excellent and ink-jetting stability is more excellent.

—Evaluation Standard—

A: The number of non-jetting nozzles was 0 to 3
B: The number of non jetting nozzles was 4 to 7
C: The number of non-jetting nozzles was 8 to 11
D: The number of non-jetting nozzles was 12 or more <Image Density Evaluation>

A solid image (100%) was recorded onto an OK top coat mat (basis weight: 104.7 g/m$^2$, paper thickness: 0.09 mm, manufactured by Oji Paper Co., Ltd.), colorimetry was performed by using Gretag Macbeth (manufactured by X-Rite, Inc.) to obtain visual density, and evaluation was performed based on the following evaluation standard. The evaluation standard is shown below. It is preferable that a value of the visual concentration is greater.

—Evaluation Standard—

A: Visual concentration was 2.2 or more
B: Visual concentration was 2.0 or more and less than 2.2
C: Visual concentration was 1.8 or more and less than 2.0
D: Visual concentration was less than 1.8

Examples 2 to 26 and Comparative Examples 1 to 9

As described in Table 2, pigment compositions were prepared in the same manner as that of Example 1, except that presence or absence of salt-milling treatment and the kind and the use amount of each component were changed.

The pigment composition of Example 25 was prepared such that concentration of solid contents of the pigment was 2.5 mass %.

In addition, in Example 3, a pigment composition was prepared in the same manner as that of Example 1, except that the dispersion time was shorter than that of Example 1.

In addition, by using the obtained pigment compositions, aqueous ink compositions were prepared in the same manner as that of Example 1.

In addition, evaluations for each composition were performed in the same manner as that of Example 1. The evaluation results are summarized in Table 2.

TABLE 2

|  | Pigment | | | Resin | |
|---|---|---|---|---|---|
|  | Kind | Salt-milling treatment | Average primary particle diameter | Kind | Content of constitutional unit represented by Table 1 (% by mass) |
| Example 1 | PO43 | Y | 95 nm | P-1 | 20 |
| Example 2 | PO43 | Y | 95 nm | P-1 | 20 |
| Example 3 | PO43 | Y | 95 nm | P-1 | 20 |
| Example 4 | PO43 | Y | 95 nm | P-1 | 20 |
| Example 5 | PO43 | Y | 95 nm | P-1 | 20 |
| Example 6 | PO43 | Y | 95 nm | P-1 | 20 |
| Example 7 | PO43 | Y | 95 nm | P-1 | 20 |
| Example 8 | PO43 | Y | 95 nm | P-1 | 20 |
| Example 9 | PO43 | Y | 95 nm | P-2 | 15 |
| Example 10 | PO43 | Y | 95 nm | P-3 | 45 |
| Example 11 | PO43 | Y | 95 nm | P-4 | 20 |
| Example 12 | PO43 | Y | 95 nm | P-5 | 20 |
| Example 13 | PO43 | Y | 95 nm | P-6 | 20 |
| Example 14 | PO43 | Y | 95 nm | P-7 | 20 |
| Example 15 | PO43 | Y | 95 nm | P-8 | 20 |
| Example 16 | PO43 | Y | 95 nm | P-9 | 20 |
| Example 17 | PO43 | Y | 95 nm | P-10 | 20 |
| Example 18 | PO43 | Y | 95 nm | P-11 | 20 |
| Example 19 | PO43 | Y | 95 nm | P-12 | 20 |
| Example 20 | PO43 | Y | 95 nm | P-13 | 20 |
| Example 21 | PO43 | Y | 95 nm | P-14 | 20 |
| Example 20 | PO43 | N | 145 nm | P-1 | 20 |
| Example 21 | PO43 | Y | 77 nm | P-1 | 20 |
| Example 22 | PR194 | Y | 95 nm | P-1 | 20 |
| Example 23 | PR178 | Y | 95 nm | P-1 | 20 |
| Example 24 | PR149 | Y | 95 nm | P-1 | 20 |
| Example 25 | PO43 | Y | 95 nm | P-1 | 20 |
| Example 26 | PO43 | Y | 95 nm | P-1 | 20 |
| Comparative Example 1 | PO43 | N | 145 nm | BYK2012 | 0 |
| Comparative Example 2 | PO43 | N | 145 nm | P-1 | 20 |
| Comparative Example 3 | PO43 | N | 145 nm | Joncryl 63J | 0 |
| Comparative Example 4 | PO43 | N | 145 nm | P-1 | 20 |
| Comparative Example 5 | PO43 | Y | 95 nm | P-1 | 20 |
| Comparative Example 6 | PO43 | N | 145 nm | P-1 | 20 |
| Comparative Example 7 | PR194 | Y | 95 nm | Joncryl 63J | 0 |
| Comparative Example 8 | PR178 | Y | 95 nm | Joncryl 63J | 0 |
| Comparative Example 9 | PR149 | Y | 95 nm | Joncryl 63J | 0 |

|  | Specific compound | | Pigment composition | Evaluation | | |
|---|---|---|---|---|---|---|
|  | Kind | Addition amount with respect to 100 parts by mass of pigment (parts by mass) | Volume average particle diameter | Sedimentation-inhibiting properties | Aggregation-inhibiting properties | Image density |
| Example 1 | C-1 | 2.5 | 115 nm | A | A | A |
| Example 2 | C-2 | 2.5 | 120 nm | A | A | A |
| Example 3 | C-1 | 2.5 | 148 nm | B | A | B |
| Example 4 | C-1 | 1.0 | 125 nm | A | A | A |
| Example 5 | C-1 | 4.5 | 123 nm | A | A | A |
| Example 6 | C-1 | 7.5 | 138 nm | B | B | B |
| Example 7 | C-3 | 2.5 | 118 nm | A | A | A |
| Example 8 | C-4 | 2.5 | 124 nm | A | A | A |
| Example 9 | C-1 | 2.5 | 120 nm | A | A | A |
| Example 10 | C-1 | 2.5 | 136 nm | A | C | B |
| Example 11 | C-1 | 2.5 | 124 nm | A | A | A |
| Example 12 | C-1 | 2.5 | 120 nm | A | A | A |
| Example 13 | C-1 | 2.5 | 120 nm | A | A | A |
| Example 14 | C-1 | 2.5 | 124 nm | A | A | A |
| Example 15 | C-1 | 2.5 | 122 nm | A | A | A |
| Example 16 | C-1 | 2.5 | 125 nm | A | A | A |
| Example 17 | C-1 | 2.5 | 131 nm | A | A | B |

TABLE 2-continued

| | | | | | | | |
|---|---|---|---|---|---|---|---|
| Example 18 | C-1 | 2.5 | 122 nm | A | A | A | |
| Example 19 | C-1 | 2.5 | 123 nm | A | A | A | |
| Example 20 | C-1 | 2.5 | 122 nm | A | A | A | |
| Example 21 | C-1 | 2.5 | 125 nm | A | A | A | |
| Example 20 | C-3 | 2.5 | 138 nm | B | A | B | |
| Example 21 | C-3 | 2.5 | 101 nm | AA | A | A | |
| Example 22 | C-1 | 2.5 | 122 nm | A | A | A | |
| Example 23 | C-1 | 2.5 | 124 nm | A | A | A | |
| Example 24 | C-1 | 2.5 | 122 nm | A | A | A | |
| Example 25 | C-3 | 2.5 | 115 nm | A | A | B | |
| Example 26 | C-5 | 2.5 | 124 nm | A | A | B | |
| Comparative Example 1 | C-1 | 2.5 | 140 nm | B | D | D | |
| Comparative Example 2 | None | — | 165 nm | D | A | D | |
| Comparative Example 3 | C-1 | 2.5 | 131 nm | B | D | D | |
| Comparative Example 4 | Solsperse 22000 | 2.5 | 151 nm | D | A | C | |
| Comparative Example 5 | None | — | 132 nm | D | A | C | |
| Comparative Example 6 | Solsperse 12000 | 2.5 | 154 nm | D | A | C | |
| Comparative Example 7 | C-1 | 2.5 | 160 nm | D | C | B | |
| Comparative Example 8 | C-1 | 2.5 | 175 nm | D | B | B | |
| Comparative Example 9 | C-1 | 2.5 | 148 nm | D | C | B | |

Denotations of the abbreviations in Table 2 other than the above descriptions are as follows.

PO43: C. I. Pigment Orange 43 (perinone-based pigment)
PR194: C. I. Pigment Red 194 (perinone-based pigment)
PR178: C. I. Pigment Red 178 (perylene-based pigment)
PR149: C. I. Pigment Red 149 (perylene-based pigment)
BYK2012: Resin not having a constitutional unit represented by Formula 1 (DISPERBYK-2012, manufactured by BYK-Chemie)
Joncryl 63J: Resin not having a constitutional unit represented by Formula 1 (manufactured by BASF Corporation)
C-1 to C-5: The above-described compounds C-1 to C-5
Solsperse22000: Compound not having a phthalimide structure and a naphthalimide structure (dispersion auxiliary agent, manufactured by Lubrizol Corporation)
Solsperse12000: Compound not having a phthalimide structure and naphthalimide structure (dispersion auxiliary agent, manufactured by Lubrizol Corporation)

As clarified from the result of Table 2, in a case of using the pigment composition according to the present disclosure, it is acknowledged that sedimentation-inhibiting properties and aggregation-inhibiting properties of the pigment are excellent, compared to the pigment compositions of Comparative Examples 1 to 6.

In addition, as clarified from the result of Table 2, the aqueous ink composition according to the present disclosure was excellent in ink jetting stability, and it was possible to form an image having a high image density.

As shown in Examples 1, 2, 7, and 8 of Table 2, in a case where a specific compound is a naphthalimide compound, it is possible to further decrease a volume average particle diameter in the pigment composition, and in a case where a carboxyalkyl group is a carboxymethyl group, it is possible to further decrease a volume average particle diameter of the pigment in the pigment composition.

As shown in Examples 1 and 4 to 6 of Table 2, in a case where the content of the specific compound is 1.0 part by mass to 7.0 parts by mass with respect to 100 parts by mass of the pigment, sedimentation-inhibiting properties and aggregation-inhibiting properties of the pigment are more excellent.

As shown in Examples 1, 9, and 10 of Table 2, in a case where the content of the constitutional unit represented by Formula 1 of the resin is 10 mass % to 40 mass %, aggregation-inhibiting properties of the pigment are more excellent.

As shown in Examples 1 and 11 to 13 of Table 2, the greater the number of carbon atoms of the alkyl group of $R^3$ in the constitutional unit represented by Formula 1 of the resin is, the smaller the volume average particle diameter of the pigment in the pigment composition can be.

As shown in Examples 7 and 20 of Table 2, it is possible to further decrease the volume average particle diameter of the pigment in the pigment composition by performing salt-milling treatment, and sedimentation-inhibiting properties of the pigment are excellent.

The content of the disclosure of Japanese Patent Application No. 2017-164810, filed on Aug. 29, 2017, is incorporated herein by reference.

All publications, patent applications, and technical standards described in the present specification are incorporated in the present specification by reference to the same extent of the case where it is specifically and individually described that each of the publications, patent applications, and technical standards are incorporated by reference.

What is claimed is:

1. A pigment composition comprising:
   at least one pigment selected from the group consisting of a perinone-based pigment and a perylene-based pigment;
   water;
   a resin having a constitutional unit represented by Formula 1; and
   at least one compound selected from the group consisting of a phthalimide compound having a carboxyalkyl group and a naphthalimide compound having a carboxyalkyl group, and
   the resin having a constitutional unit represented by Formula 1 is an acrylic resin, Formula (1)

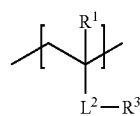

in Formula 1, $R^1$ represents a hydrogen atom or a methyl group, $L^2$ represents —C(=O)O—, —OC(=O)—, or —C(=O)NR²—, $R^2$ represents a hydrogen atom or an alkyl group having 1 to 6 carbon atoms, and $R^3$ represents an alkyl group having 6 or more carbon atoms.

2. The pigment composition according to claim 1, wherein the pigment includes at least one pigment selected from the group consisting of C. I. Pigment Orange 43, C. I. Pigment Red 194, C. I. Pigment Red 123, C. I. Pigment Red 149, C. I. Pigment Red 178, C. I. Pigment Red 179, C. I. Pigment Red 189, C. I. Pigment Red 190, and C. I. Pigment Black 31.

3. The pigment composition according to claim 1, wherein the pigment includes a perinone-based pigment.

4. The pigment composition according to claim 1, wherein the pigment includes C. I. Pigment Orange 43.

5. The pigment composition according to claim 1, wherein the carboxyalkyl group in the at least one compound selected from the group consisting of a phthalimide compound having a carboxyalkyl group and a naphthalimide compound having a carboxyalkyl group is a carboxymethyl group or a carboxyethyl group.

6. The pigment composition according to claim 1, wherein the at least one compound selected from the group consisting of a phthalimide compound having a carboxyalkyl group and a naphthalimide compound having a carboxyalkyl group is a naphthalimide compound having a carboxyalkyl group.

7. The pigment composition according to claim 1, wherein $R^3$ is an alkyl group having 8 to 22 carbon atoms.

8. The pigment composition according to claim 1, wherein the resin having a constitutional unit represented by Formula 1 further has a constitutional unit having an aromatic ring.

9. The pigment composition according to claim 1, wherein the resin having a constitutional unit represented by Formula 1 further has a constitutional unit having an acidic group.

10. An aqueous ink composition including the pigment composition according to claim 1.

11. A method for producing a pigment composition comprising:
a step of mixing at least one pigment selected from the group consisting of a perinone-based pigment and a perylene-based pigment, water, a resin having a constitutional unit represented by Formula 1, and at least one compound selected from the group consisting of a phthalimide compound having a carboxyalkyl group and a naphthalimide compound having a carboxyalkyl group, and
the resin having a constitutional unit represented by Formula 1 is an acrylic resin,

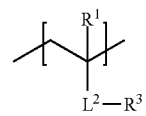

Formula (1)

in Formula 1, $R^1$ represents a hydrogen atom or a methyl group, $L^2$ represents —C(=O)O—, —OC(=O)—, or —C(=O)NR²— and $R^2$ represents a hydrogen atom or an alkyl group having 1 to 6 carbon atoms, and $R^3$ represents an alkyl group having 6 or more carbon atoms.

12. The method for producing a pigment composition according to claim 11, the method comprising:
a step of performing salt-milling treatment on at least one pigment selected from the group consisting of a perinone-based pigment and a perylene-based pigment, before the mixing step.

* * * * *